United States Patent
Hu

(10) Patent No.: US 8,284,292 B2
(45) Date of Patent: Oct. 9, 2012

(54) PROBABILITY DISTRIBUTION CONSTRUCTING METHOD, PROBABILITY DISTRIBUTION CONSTRUCTING APPARATUS, STORAGE MEDIUM OF PROBABILITY DISTRIBUTION CONSTRUCTING PROGRAM, SUBJECT DETECTING METHOD, SUBJECT DETECTING APPARATUS, AND STORAGE MEDIUM OF SUBJECT DETECTING PROGRAM

(75) Inventor: Xuebin Hu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 762 days.

(21) Appl. No.: 12/414,301

(22) Filed: Mar. 30, 2009

(65) Prior Publication Data
US 2009/0245579 A1    Oct. 1, 2009

(30) Foreign Application Priority Data

Mar. 31, 2008 (JP) ................................ 2008-091562

(51) Int. Cl.
*G03B 13/00* (2006.01)
*H04N 5/232* (2006.01)
*H04N 7/18* (2006.01)
*H04N 5/225* (2006.01)
*G06K 9/00* (2006.01)

(52) U.S. Cl. ......... 348/345; 382/103; 348/143; 348/169

(58) Field of Classification Search ................... 348/345, 348/143; 382/103
See application file for complete search history.

(56) References Cited

U.S. PATENT DOCUMENTS
2011/0164786 A1* 7/2011 Iwamura ....................... 382/103

FOREIGN PATENT DOCUMENTS
| JP | 2003-189295 A | 7/2003 |
|---|---|---|
| JP | 2004-302700 A | 10/2004 |
| JP | 2007-025902 A | 2/2007 |
| JP | 2007-078409 A | 3/2007 |
| JP | 2007-188419 A | 7/2007 |

OTHER PUBLICATIONS

Verma et al., "Face Detection and Tracking in a Video by Propagating Detection Probabilities", Oct. 2003, IEEE—Transactions on Pattern Analysis and Machine Intelligence, vol. 25 No. 10, p. 1215-1228.*

(Continued)

*Primary Examiner* — Jeffrey R Swearingen
*Assistant Examiner* — Taylor Elfervig
(74) *Attorney, Agent, or Firm* — Sughrue Mion, PLLC

(57) ABSTRACT

A probability distribution constructing method extracts a subject shape similar to a subject of a specific type repeatedly appearing in various sizes in plural images obtained by repeatedly photographing a field using a fixedly disposed camera, from plurality images, in accordance with a size of the similar subject shape and positional information of the camera on a view angle. Subsequently, the probability distribution constructing method determines the similar subject shape, and calculates an appearance probability distribution of the size of the subject, and detects the subject using the appearance probability distribution.

21 Claims, 28 Drawing Sheets

OTHER PUBLICATIONS

Delac, K.; Grgic, M.; Grgic, S.; , "Statistics in face recognition: analyzing probability distributions of PCA, ICA and LDA performance results," Image and Signal Processing and Analysis, 2005. ISPA 2005. Proceedings of the 4th International Symposium on, vol., No., pp. 289-294, Sep. 15-17, 2005.*

Hualu Wang; Shih-Fu Chang; , "A highly efficient system for automatic face region detection in MPEG video," Circuits and Systems for Video Technology, IEEE Transactions on, vol. 7, No. 4, pp. 615-628, Aug. 1997.*

Feraund, R.; Bernier, O.J.; Viallet, J.-E.; Collobert, M.; , "A fast and accurate face detector based on neural networks," Pattern Analysis and Machine Intelligence, IEEE Transactions on, vol. 23, No. 1, pp. 42-53, Jan. 2001.*

Japanese Office Action issued in corresponding Japanese Patent Application No. 2008-091562 dated Jan. 31, 2012.

* cited by examiner

| | QR1 | QR2 | ... | QR8 | ... | QR15 | QR16 |
|---|---|---|---|---|---|---|---|
| PQ1 | 0 | 22.5 | | 22.5 | | 45.0 | 22.5 |
| PQ2 | 22.5 | 0 | | 45.0 | | 67.5 | 45.0 |
| ... | | | | | | | |
| PQ4 | 67.5 | 22.5 | | 90.0 | | 67.5 | 90.0 |
| ... | | | | | | | |
| PQ15 | 45.0 | 67.5 | | 22.5 | | 0 | 22.5 |
| PQ16 | 22.5 | 45.0 | | 0 | | 22.5 | 0 |

FIRST VALUE (rows) / SECOND VALUE (columns)

PROBABILITY DISTRIBUTION CONSTRUCTING METHOD, PROBABILITY DISTRIBUTION CONSTRUCTING APPARATUS, STORAGE MEDIUM OF PROBABILITY DISTRIBUTION CONSTRUCTING PROGRAM, SUBJECT DETECTING METHOD, SUBJECT DETECTING APPARATUS, AND STORAGE MEDIUM OF SUBJECT DETECTING PROGRAM

BACKGROUND OF THE INVENTION

1. Field of the Invention

The present invention relates to a probability distribution constructing method and apparatus that constructs, based on plural images obtained by repeatedly photographing a field using a fixedly disposed camera, an appearance probability distribution of a size of a subject of a specific type that repeatedly appears having various sizes in the plural images, a storage medium of a probability distribution constructing program that allows a computer to operate as the probability distribution constructing apparatus, and also to a subject detecting method and apparatus that detects a subject using the appearance probability distribution, and a storage medium of a subject detecting program that allows the computer to operate as the subject detecting apparatus.

2. Description of the Related Art

In general, security cameras have been disposed in convenience stores or banks as one of security countermeasures. Moving picture images that are photographed by the security cameras have been displayed on a display screen of a monitoring room or the like and have been recorded. The moving images have been used to specify a criminal when a crime occurs.

In the past, the moving images that are photographed by the security cameras have been recorded as analog data. However, in recent years, the moving images have been recorded as digital data, for convenience of management. In addition, in the security cameras that have the above-described usage purpose, the moving images that are photographed over a long period of time need to be recorded, but there is a limitation in a recording capacity of a recording device that records the moving images. For this reason, when the moving images are recorded, a compressing process is applied to the moving images. Meanwhile, if the compressing process is applied to the moving images, the moving images may become unclear. If the moving images become unclear, it may be difficult to precisely grasp the situation of an event or specify a person from the moving images.

In recent years, in a field of an imaging apparatus such as digital cameras, with the development of a hardware technique of the imaging apparatus, a software technique of the imaging apparatus has been developed. One example of the software technique is a technique for detecting a face portion of a person in a photographing view angle, that is, a so-called face detecting technique. In the face detecting technique, generally, face parts, such as eyes, a nose, and a mouth, which form the face portion in the photographing view angle, are detected, and the face portion in the photographing view angle is detected on the basis of the detected face parts (for example, refer to Japanese Patent Application Publication No. 2007-188419).

If the face detecting technique is applied to the security camera, it is possible to detect a face portion of a person in a photographing view angle, when the moving images are taken. In addition, when the moving images are recorded, a high compressing process can be applied only to an area other than the detected face portion. In this way, it is conceivable to realize a security camera capable to obtaining a recorded moving image in which the face portion of a person in is clear, which makes it possible to readily specify a person who faced the security camera.

In this case, in order to effectively utilize moving images taken by the security cameras for the purpose of specifying the person, it is important to specify not only a person who is facing the security camera, but also a person whose back is directed to the security camera. This requires, besides the detection of the face portion of a person, that is, the front of the person, the detection of the head portion of the person including the front, flanks, and back of the person. If the head portion can be detected in moving images, it is possible to follow the detected head portion within a photographing view angle, which is largely effective when specifying a person.

In this case, when the face portion or the head portion of the person in the photographing view angle is detected, it is important to improve detection precision by suppressing the probability of erroneous detection. That is, it is necessary to improve the detection precision not only based on detection information of the face portion or the head portion but also on the basis of a variety of information about an environment around the face portion or the head portion.

SUMMARY OF THE INVENTION

The present invention has been made in view of the above circumstances and provides a probability distribution constructing method and apparatus that constructs, based on plural images obtained by repeatedly photographing a field using a fixedly disposed camera, an appearance probability distribution of a size of a subject of a specific type that repeatedly appears in various sizes in the plural images, a storage medium that stores a probability distribution constructing program that allows a computer to operate as the probability distribution constructing apparatus, a subject detecting method and apparatus that detects a subject with high precision using the appearance probability distribution, and a storage medium that stores a subject detecting program that causes the computer to operate as the subject detecting apparatus.

A probability distribution constructing method of the invention constructs, based on plural images obtained by repeatedly photographing a field using a fixedly disposed camera, an appearance probability distribution of a size of a subject of a specific type repeatedly appearing in various sizes in the plural images, and the probability distribution constructing method includes:

an image acquiring step that acquires the plural images from the camera;

an extracting step that extracts, from the plural images acquired in the image acquiring step, a similar subject shape similar to the subject of the specific type, together with a size of the similar subject shape and positional information of the camera on a view angle;

a filtering step that determines whether the similar subject shape extracted in the extracting step is the subject of the specific type so as to extract the subject of the specific type; and a probability distribution calculating step that calculates an appearance probability distribution of the size of the subject extracted in the filtering step.

According to the probability distribution constructing method of the present invention, it is possible to contract an appearance probability distribution of the size of the subject of the specific type repeatedly appearing in various sizes in the plural images, which is useful for detecting the subject with high precision in the plural images obtained by repeatedly photographing the field using the fixedly disposed camera.

In the probability distribution constructing method according to the present invention, it is preferable that the probability distribution calculating step is a step of calculating, for each of plural sizes of the subject of the specific type, an appearance location probability distribution for one size of the subject of the specific type that appears at each location in a view angle.

According to this preferable aspect, the appearance location probability distribution can be easily calculated.

Further, in the probability distribution constructing method according to the present invention, it is also preferable that the probability distribution calculating step includes:

a step of calculating an appearance location probability distribution of the subject in a predetermined size by applying an interpolation operating process to an appearance location probability distribution of the subject in a size different from the predetermined size.

According to this preferable aspect, even when the number of subjects having the specific size among the subjects extracted by the filtering step is small, it is possible to calculate an appearance probability distribution over the entire range of the view angle of the camera.

In the probability distribution constructing method according to the present invention, it is also preferable that the probability distribution calculating step is a step of calculating, for each of plural locations in the view angle, an appearance size probability distribution of the subject of the specific type that appears at one location in a view angle with respect to the one location.

According to this preferable aspect, the appearance size probability distribution can be easily calculated.

In the probability distribution constructing method according to the present invention, it is also preferable that the probability distribution calculating step includes:

a step of calculating an appearance size probability distribution at a predetermined location in the view angle by applying an interpolation operating process to an appearance size probability distribution at a location different from the predetermined location.

According to this preferable aspect, even when the number of subjects at any locations in the view angle among the subjects extracted by the filtering step is small, it is possible to calculate an appearance probability distribution over the entire range of the view angle of the camera.

In the probability distribution constructing method according to the present invention, it is preferable that the extracting step is a step of calculating, when extracting the similar subject shape, an evaluation value that indicates a degree of the possibility that the similar subject shape belongs to the subject targeted for extraction, and extracting the similar subjection shape only when the evaluation value is higher, in term of the possibility that the similar subject shape belongs to the subject targeted for the extraction, than a threshold value set to allow leakage from the extraction.

Here, the purpose of the extracting step is not to surely extract the subject of the extraction target but to extract only the subject that is determined as the subject of the extraction target. In this respect, according to this preferable aspect, because those with the low possibility of being the subject of the extraction target can be excluded, it is possible to construct the appearance probability distribution with higher precision.

In the probability distribution constructing method according to the present invention, it is also preferable that the filtering step is a step of counting, for each of the similar subject shapes extracted in the extracting step, the number of other similar subject shapes that are classified as having the same size as the similar subject shape and exist in a search area in a predetermined size spread around the similar subject shape in a view angle, and extracting the similar subject shape as a shape of the subject of the specific type only when a value obtained by the counting is equal to or larger than a threshold value.

According to this preferable aspect, since the similar subject shape where the possibility of erroneous detection is high can be excluded from the similar subject shapes that are extracted by the extracting step, it is possible to construct an appearance probability distribution with higher precision.

In the probability distribution constructing method according to the present invention, it is also preferable that the camera is a camera that can change a photographing direction, and the probability distribution constructing method further includes an integrating step of integrating the appearance probability distributions obtained by photographing in plural photographing directions, thereby constructing an appearance probability distribution in a view angle that is obtained by linking view angles of the plural photographing directions.

According to this preferable aspect, it is possible to construct an appearance probability distribution for a camera that can change the photographing direction.

In the probability distribution constructing method according to the present invention, it is also preferable that the camera is a camera that can change a focal distance, and the probability distribution constructing method further includes an integrating step of integrating the appearance probability distributions obtained by photographing based on plural focal distances, thereby constructing an appearance probability distribution in a view angle of a widest angle of the camera.

According to this preferable aspect, it is possible to construct an appearance probability distribution for a camera that can change the focal distance.

A probability distribution constructing apparatus of the present invention constructs, based on plural images obtained by repeatedly photographing a field using a fixedly disposed camera, an appearance probability distribution of a size of a subject of a specific type repeatedly appearing in various sizes in the plural images, and the probability distribution constructing apparatus includes:

an image acquiring section that acquires the plural images from the camera;

an extracting section that extracts, from the plural images acquired by the image acquiring section, a similar subject shape similar to the subject of the specific type, together with a size of the similar subject shape and positional information of the camera on a view angle;

a filtering section that determines whether the similar subject shape extracted by the extracting section is the subject of the specific type so as to extract the subject of the specific type; and a probability distribution calculating section that calculates an appearance probability distribution of the size of the subject extracted by the filtering section.

According to the probability distribution constructing apparatus of the present invention, it is possible to contract an appearance probability distribution of the size of the subject of the specific type repeatedly appearing in various sizes in the plural images, which is useful for detecting the subject with high precision in the plural images obtained by repeatedly photographing the field using the fixedly disposed camera.

In the probability distribution constructing apparatus according to the present invention, it is preferable that the probability distribution calculating section calculates, for each of plural sizes of the subject of the specific type, an appearance location probability distribution for one size of the subject of the specific type that appears at each location in a view angle.

According to this preferable aspect, the appearance location probability distribution can be easily calculated.

In the probability distribution constructing apparatus according to the present invention, it is preferable that the probability distribution calculating section includes:

an interpolation operating process that calculates an appearance location probability distribution of the subject in a predetermined size by applying an interpolation operating process to an appearance location probability distribution of the subject in a size different from the predetermined size.

According to this preferable aspect, even when the number of subjects having the specific size among the subjects extracted by the filtering section is small, it is possible to calculate an appearance probability distribution over the entire range of the view angle of the camera.

In the probability distribution constructing apparatus according to the present invention, it is preferable that the probability distribution calculating section calculates, for each of plural locations in the view angle, an appearance size probability distribution of the subject of the specific type that appears at one location in a view angle with respect to the one location.

According to this preferable aspect, the appearance size probability distribution can be easily calculated.

In the probability distribution constructing apparatus according to the present invention, it is also preferable that the probability distribution calculating section includes:

an interpolation operating section that calculates an appearance size probability distribution at a predetermined location in the view angle by applying an interpolation operating process to an appearance size probability distribution at a location different from the predetermined location.

According to this preferable aspect, even when the number of subjects at any locations in the view angle among the subjects extracted by the filtering section is small, it is possible to calculate an appearance probability distribution over the entire range of the view angle of the camera.

In the probability distribution constructing apparatus according to the present invention, it is also preferable that the extracting section calculates, when extracting the similar subject shape, an evaluation value that indicates a degree of the possibility that the similar subject shape belongs to the subject targeted for extraction, and extracting the similar subjection shape only when the evaluation value is higher, in term of the possibility that the similar subject shape belongs to the subject targeted for the extraction, than a threshold value set to allow leakage from the extraction.

Here, the purpose of the extracting section is not to surely extract the subject of the extraction target but to extract only the subject that is determined as the subject of the extraction target. In this respect, according to this preferable aspect, because those with the low possibility of being the subject of the extraction target can be excluded, it is possible to construct the appearance probability distribution with higher precision.

In the probability distribution constructing apparatus according to the present invention, it is also preferable that the filtering section counts, for each of the similar subject shapes extracted in the extracting step, the number of other similar subject shapes that are classified as having the same size as the similar subject shape and exist in a search area in a predetermined size spread around the similar subject shape in a view angle, and extracts the similar subject shape as a shape of the subject of the specific type only when a value obtained by the counting is equal to or larger than a threshold value.

According to this preferable aspect, since the similar subject shape where the possibility of erroneous extraction is high can be excluded from the similar subject shapes that are extracted by the extracting section, it is possible to construct an appearance probability distribution with higher precision.

In the probability distribution constructing apparatus according to the present invention, it is also preferable that the camera is a camera that can change a photographing direction, and the probability distribution constructing apparatus further includes an integrating section that integrates the appearance probability distributions obtained by photographing in plural photographing directions, thereby constructing an appearance probability distribution in a view angle that is obtained by linking view angles of the plural photographing directions.

According to this preferable aspect, it is possible to construct an appearance probability distribution for a camera that can change the photographing direction.

In the probability distribution constructing apparatus according to the present invention, it is also preferable that the camera is a camera that can change a focal distance, and the probability distribution constructing apparatus further includes an integrating section that integrates the appearance probability distributions obtained by photographing based on plural focal distances, thereby constructing an appearance probability distribution in a view angle of a widest angle of the camera.

According to this preferable aspect, it is possible to construct an appearance probability distribution for a camera that can change the focal distance.

The probability distribution constructing apparatus according to the present invention, preferably further includes:

an output section that outputs the appearance probability distribution calculated by the probability distribution calculating section.

According to this preferable aspect, the output appearance probability distribution can be referred to. For example, the number of similar subject shapes extracted by the extracting section is confirmed and a complement countermeasure can be taken when the number of similar subject shapes is small. This makes it possible to construct of the appearance probability distribution with higher precision.

The probability distribution constructing apparatus according to present invention, preferably further includes:

an update control section that causes, even after the appearance probability distribution is constructed, the image acquiring section to newly acquire an image, causes the extracting section and the filtering section to apply respective processes to the newly acquired image, and causes the probability distribution calculating section to upon date the appearance probability distribution by adding thereto information about the subject of the specific type extracted from the newly acquired image.

According to this preferable aspect, it is possible to improve precision of the appearance probability distribution.

A storage medium of the present invention stores a probability distribution constructing program that is executed in a computer and allows the computer to operate as a probability distribution constructing apparatus that constructs, based on plural images obtained by repeatedly photographing a field using a fixedly disposed camera, an appearance probability distribution of a size of a subject of a specific type repeatedly appearing in various sizes in the plural images, the probability distribution constructing program causes the computer to implement:

an image acquiring section that acquires the plural images from the camera;

an extracting section that extracts, from the plural images acquired by the image acquiring section, a similar subject shape similar to the subject of the specific type, together with a size of the similar subject shape and positional information of the camera on a view angle;

a filtering section that determines whether the similar subject shape extracted by the extracting section is the subject of the specific type so as to extract the subject of the specific type; and a probability distribution calculating section that calculates an appearance probability distribution of the size of the subject extracted by the filtering section.

When the probability distribution constructing program is installed in the computer, the probability distribution constructing program causes the computer to operate as the probability distribution constructing apparatus according to the present invention. All aspects that correspond to the various functions of the probability distribution constructing apparatus are also included in the probability distribution constructing program.

Further, in the constituent elements, the image acquiring section, which constitute the probability distribution constructing program according to the present invention, a function of one constituent element may be executed by one program component, the function of one constituent element may be executed by plural program components, or functions of the plural constituent elements may be executed by one program component. In addition, the constituent elements may implement the functions without depending on other programs or program components or may execute the functions in accordance with an instruction from other programs or program components that are incorporated in the computer.

Further, in the probability distribution constructing apparatus and the probability distribution constructing program according to the present invention, the constituent elements are provided with the same names. However, these constituent elements mean hardware and software in the probability distribution constructing apparatus but means only software in the probability distribution constructing program.

A first subject detecting method of the present invention includes:

the probability distribution constructing method with any one of the above-described preferable aspects;

an appearance area defining step of defining an appearance area for each size of the subject of the specific type appearing in the view angle of the camera, on the basis of the appearance probability distribution calculated in the probability distribution calculating step; and a subject detecting step of detecting the subject of the specific type appearing as a similar subject shape having the size, in an appearance area according to the size in an image obtained by new photographing using the camera.

The first subject detecting method detects, in an appearance area according to each size of the subject of the specific type appearing in the view angle, the subject of the specific type appearing as the similar subject shape having the size. Accordingly, high speed detection is realized and erroneous detection is suppressed.

A second subject detecting method of the present invention includes:

the probability distribution constructing method with any one of the above-described preferable aspects;

a second extracting step of extracting a similar subject shape similar to the subject of the specific type from an image obtained by new photographing using the camera, together with a size of the similar subject shape, positional information of the camera on the view angle, and an evaluation value that indicates the probability of the similar subject shape being the subject of the specific type; and a second determining step of modifying the evaluation value on the basis of the size of the similar subject shape, the positional information, and the evaluation value extracted in the second extracting step, as well as the appearance probability distribution calculated in the probability distribution calculating step, and determining whether the similar subject shape is the subject of the specific type on the basis of the modified evaluation value.

According to the first subject detecting method, when the appearance probability is low on the appearance probability distribution, it is determined that the similar subject shape is not the subject of the specific type. Meanwhile, according to the second subject detecting method, when the evaluation value is high, even if the appearance probability is low on the appearance probability distribution, it is determined that the similar subject shape is the subject of the specific type. As a result, the subject can be detected with high precision.

A first subject detecting apparatus of the present invention includes:

the probability distribution constructing apparatus with any one of the above-described preferable aspects;

an appearance area defining section that defines an appearance area for each size of the subject of the specific type appearing in the view angle of the camera, on the basis of the appearance probability distribution calculated by the probability distribution calculating section; and a subject detecting section that detects the subject of the specific type appearing as a similar subject shape having the size, in an appearance area according to the size in an image obtained by new photographing using the camera.

The first subject detecting apparatus detects, from an appearance area according to each size of the subject of the specific type appearing in the view angle, the subject of the specific type appearing as the similar subject shape having the size. Accordingly, high speed detection is realized and erroneous detection is suppressed.

A second subject detecting apparatus of the present invention in includes:

the probability distribution constructing apparatus with any one of the above-described preferable aspects;

a second extracting section that extracts a similar subject shape similar to the subject of the specific type from an image obtained by new photographing using the camera, together with a size of the similar subject shape, positional information of the camera on the view angle, and an evaluation value that indicates the probability of the similar subject shape being the subject of the specific type; and a second determining section that modifies the evaluation value on the basis of the size of the similar subject shape, the positional information, and the evaluation value extracted in the second extracting step, as well as the appearance probability distribution calculated by the probability distribution calculating section, and determines whether the similar subject shape is the subject of the specific type on the basis of the modified evaluation value.

According to the first subject detecting apparatus, when the appearance probability is low on the appearance probability distribution, it is determined that the similar subject shape is not the subject of the specific type. Meanwhile, according to the second subject detecting apparatus, when the evaluation value is high, even if the appearance probability is low on the appearance probability distribution, it is determined that the similar subject shape is the subject of the specific type. As a result, the subject can be detected with high precision.

A first storage medium of the present invention stores a first subject detecting program having the probability distribution constructing program with any of the above-described preferable aspects, the subject detecting program causing the computer operating as the subject detecting apparatus to further implement:

an appearance area defining section that defines an appearance area for each size of the subject of the specific type appearing in the view angle of the camera, on the basis of the appearance probability distribution calculated by the probability distribution calculating section; and a subject detecting section that detects the subject of the specific type appearing as a similar subject shape having the size, in an appearance area according to the size in an image obtained by new photographing using the camera.

When installed in the computer, the first subject detecting program causes the computer to operate as the first subject detecting apparatus of the present invention.

Further, in the constituent elements, such as the appearance area defining section, which constitute the first subject detecting program, a function of one constituent element may be executed by one program component, the function of one constituent element may be executed by plural program components, or functions of the plural constituent elements may be executed by one program component. In addition, the constituent elements may execute the functions without depending on other programs or program components or may implement the functions in accordance with an instruction from other programs or program components that are incorporated in the computer.

Further, in the first subject detecting apparatus and the first subject detecting program of the present invention, the constituent elements are provided with the same names. However, these constituent elements mean hardware and software in the first subject detecting apparatus but means only software in the first subject detecting program.

A second storage medium of the present invention stores a second subject detecting program having the probability distribution constructing program with any of the above-described preferable aspects, the subject detecting program causing the computer operating as the subject detecting apparatus to further implement:

a second extracting section that extracts a similar subject shape similar to the subject of the specific type from an image obtained by new photographing using the camera, together with a size of the similar subject shape, positional information of the camera on the view angle, and an evaluation value that indicates the probability of the similar subject shape being the subject of the specific type; and a second determining section that modifies the evaluation value on the basis of the size of the similar subject shape, the positional information, and the evaluation value extracted in the second extracting step, as well as the appearance probability distribution calculated by the probability distribution calculating section, and determines whether the similar subject shape is the subject of the specific type on the basis of the modified evaluation value.

When installed in the computer, the second subject detecting program causes the computer to operate as the second subject detecting apparatus of the present invention.

Further, in the constituent elements, such as the second extracting section, which constitute the second subject detecting program of the present invention, a function of one constituent element may be executed by one program component, the function of one constituent element may be executed by plural program components, or functions of the plural constituent elements may be executed by one program component. In addition, the constituent elements may implement the functions without depending on other programs or program components or may execute the functions in accordance with an instruction from other programs or program components that are incorporated in the computer.

Further, in the second subject detecting apparatus and the second subject detecting program of the present invention, the elements are provided with the same names. However, these constituent elements mean hardware and software in the second subject detecting apparatus but mean only software in the second subject detecting program.

According to the probability distribution constructing method, the probability distribution constructing apparatus, and the probability distribution constructing program that causes the computer to operate as the probability distribution constructing apparatus, an appearance probability distribution for a size of a subject of a specific type that becomes a target for detection can be obtained with high precision. In addition, According to the subject detecting method, the subject detecting apparatus, and the subject detecting program that causes the computer to operate as the subject detecting apparatus according to the present invention, precision of subject detection can be improved using the appearance probability distribution.

BRIEF DESCRIPTION OF THE DRAWINGS

FIG. 16 is a diagram illustrating an example of a table that is stored in a table storage section;

DETAILED DESCRIPTION

Hereinafter, preferred embodiments of the present invention will be described with reference to the appended drawings.

Figure 1:
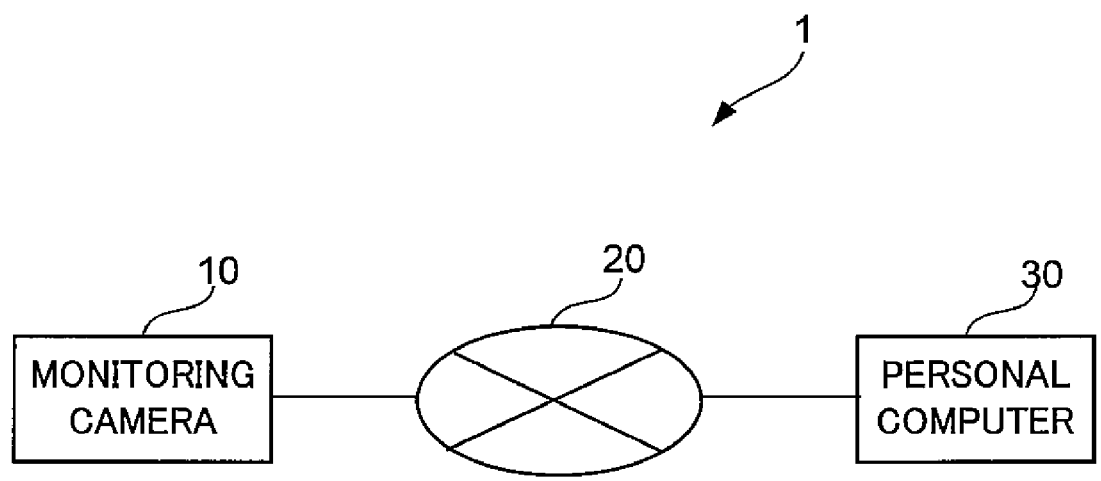
FIG. 1 is a diagram illustrating the schematic configuration of a monitoring camera system where a subject detecting apparatus according to a first embodiment of the present invention is incorporated.

FIG. 1 is a diagram illustrating a schematic configuration of a monitoring camera system 1 where a subject detecting apparatus according to the first embodiment of the present invention is incorporated.

In the schematic configuration diagram of the monitoring camera system 1 in FIG. 1, a monitoring camera 10, the Internet 20, and a personal computer 30 are shown.

The monitoring camera 10 is disposed and fixed onto, for example, a ceiling of a bank, and photographs an internal situation of the bank as viewed in a diagonally downward direction from the ceiling. Further, the monitoring camera 10 is a monitoring camera that has a swing function and enables a variation in a photographing direction. The monitoring camera 10 has a zoom function and can change a focal distance. In addition, the monitoring camera 10 is connected to the Internet 20 and transmits image data indicating a moving image to the personal computer 30 through network communication. The block labeled with the monitoring camera 10 shown in FIG. 1 may represent one monitoring camera, but this block represents plural monitoring cameras here. Further, the monitoring camera 10 is a camera that photographs an internal situation of the bank as viewed in a diagonally downward direction from the ceiling. However, the present invention is not limited thereto, and any type of camera that can be fixedly disposed and repeatedly photograph a subject may be used without depending on the installation location or angle.

The personal computer 30 is connected to the Internet 20, and receives image data transmitted from the monitoring camera 10 through the network communication. Further, the personal computer 30 handles all the moving images photographed by the monitoring camera 10. In this case, an upper part of a head portion of a person is approximately shaped like a semicircle. In addition, in order to realize a subject detecting method according to the first embodiment of the present invention, the personal computer 30 constructs, based on plural images constituting moving images obtained by repeatedly photographing a field using the fixedly disposed monitoring camera 10 in the subject detecting apparatus according to the first embodiment of the present invention, an appearance probability distribution of the size of a head portion of a person with an upper part whose outline is in the shape of an approximately semicircle, which repeatedly appears in various sizes in the plural images, and detects the head portion of the person using the constructed appearance probability distribution. Further, the personal computer 30 is the probability distribution constructing apparatus according to the first embodiment of the present invention to realize a probability distribution constructing method according to the first embodiment of the present invention.

In this case, since the monitoring camera 10 is not the subject matter of the present invention, the detailed explanation thereof will not be described. Hereinafter, there will be described the personal computer 30 that operates as the subject detecting apparatus according to the first embodiment of the present invention, constructs the appearance probability distribution, and detects the head portion of the person using the constructed appearance probability distribution.

Figure 2:
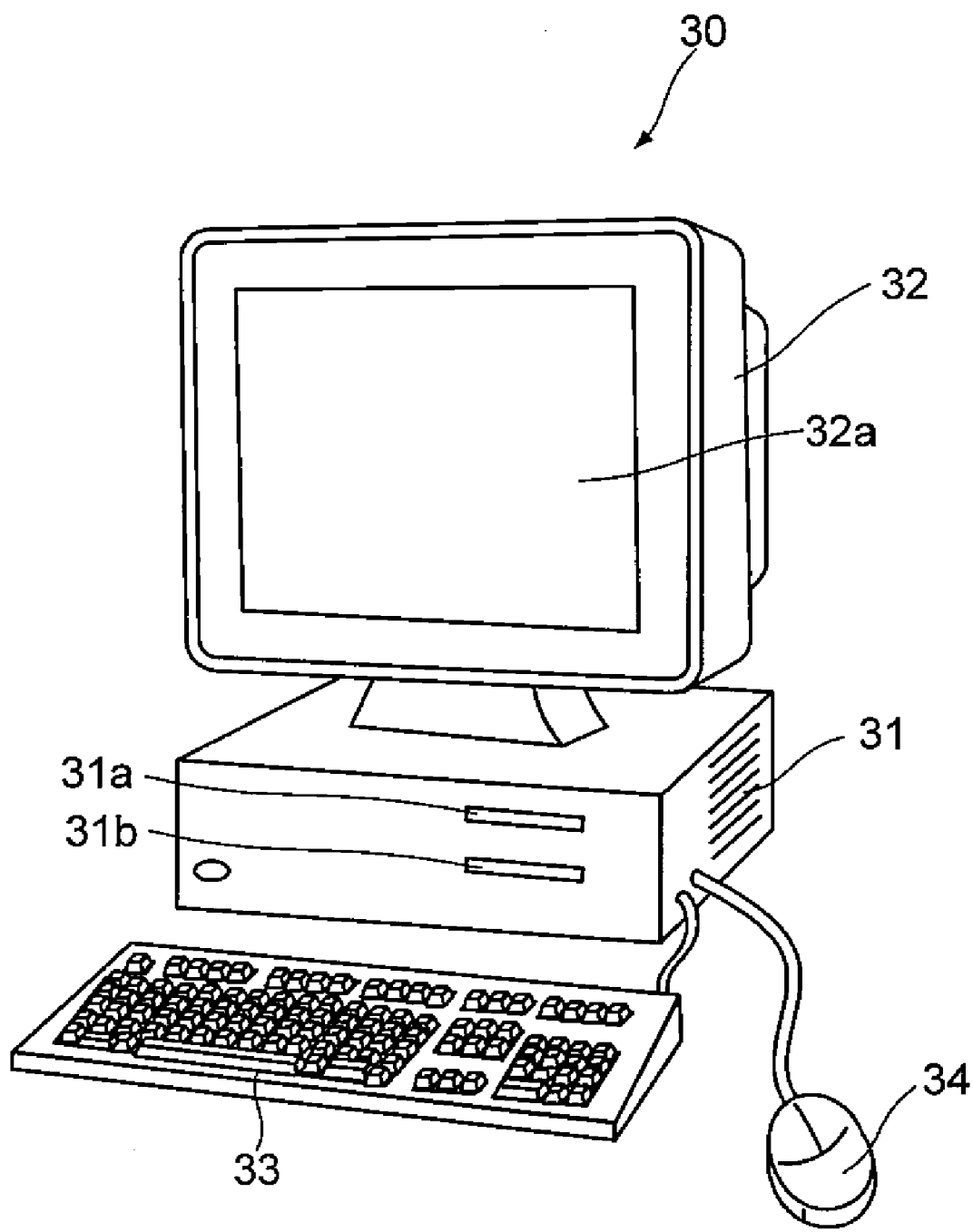
FIG. 2 is a perspective view illustrating the outer appearance of a personal computer that is shown by one block in FIG. 1.
Figure 3:
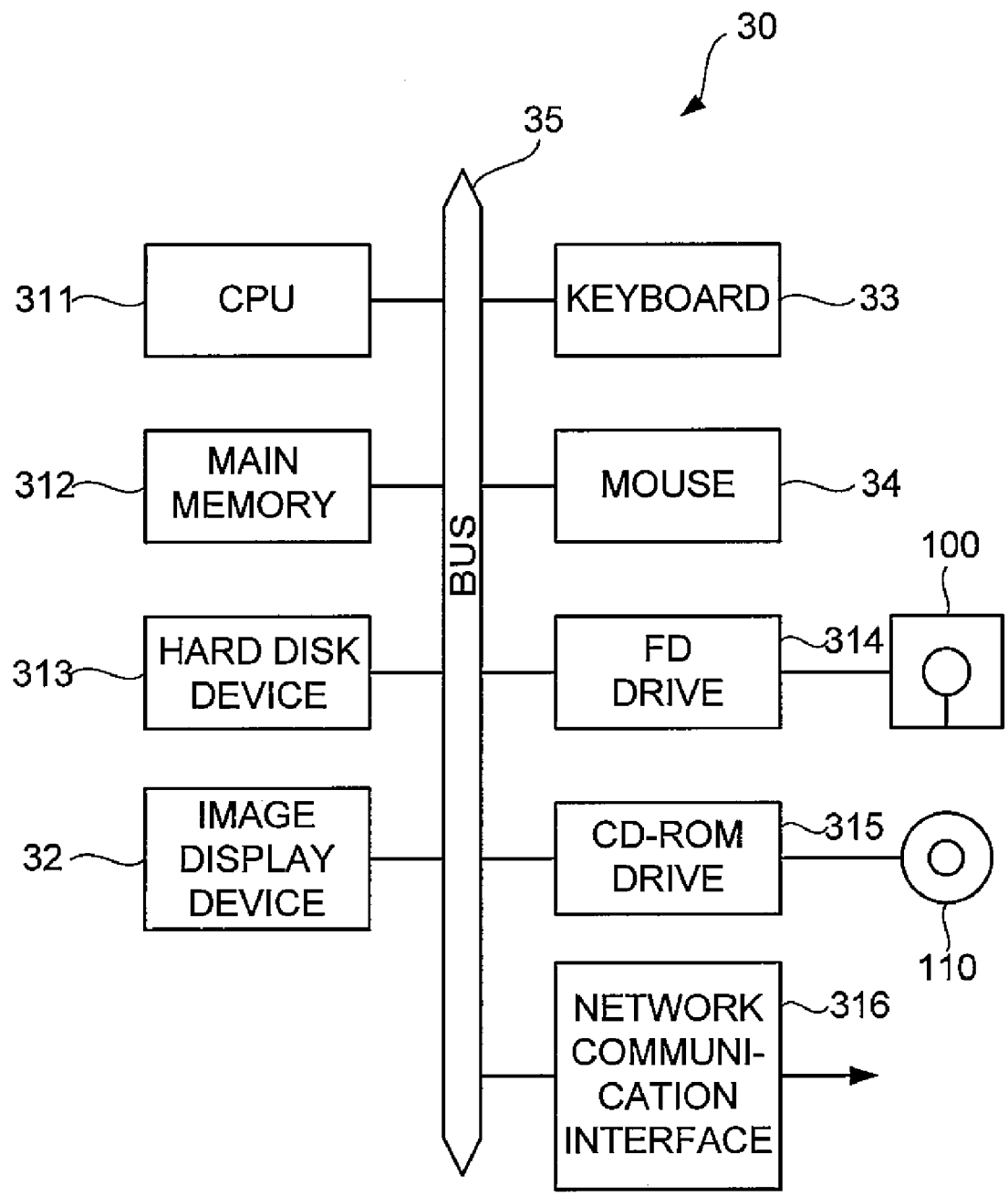
FIG. 3 is a diagram illustrating the hardware configuration of a personal computer shown in FIGS. 1 and 2.

FIG. 2 is an external view of the personal computer 30 shown in one block in FIG. 1. FIG. 3 is a diagram illustrating a hardware configuration of the personal computer 30.

In this case, the subject detecting apparatus according to the first embodiment of the present invention is configured by an OS (Operation System) and hardware of the personal computer 30 and a subject detecting program that is installed and executed in the personal computer 30.

From the outer appearance, the personal computer 30 includes a main device 31, an image display device 32 that displays an image on a display screen 32a in accordance with an instruction from the main device 31, a keyboard 33 for inputting various types of information according to key operations into the main device 31, and a mouse 34 for designating an arbitrary location on the display screen 32a and inputting an instruction corresponding to an icon or the like displayed at the designated location. The main device 31 externally has an FD loading port 31a for loading a flexible disk (FD), and a CD-ROM loading port 31b for loading a CD-ROM.

As shown in FIG. 3, the main device 31 includes: a CPU 311 that executes various programs, a main memory 312 where programs stored in a hard disk device 313 are read and developed to be executed by the CPU 311, the hard disk device 313 where the various programs and data are stored, an FD drive 314 for accessing a FD 100 loaded therein, a CD-ROM drive 315 for accessing a CD-ROM 110 loaded therein, and a network communication interface 316 that is connected to the Internet 20 shown in FIG. 1 and controls network communication with the monitoring camera 10. These elements and the image display device 32, the keyboard 33, and the mouse 34 shown in FIG. 2 are interconnected through a bus 35.

In this case, the CD-ROM 110 stores a subject detecting program that allows the personal computer 30 to operate as the subject detecting apparatus of the present invention. When the CD-ROM 110 is loaded on the CD-ROM drive 315, the subject detecting program stored in the CD-ROM 110 is uploaded to the personal computer 30 and stored in the hard disk device 313.

First, there will be described the first embodiment in which the subject detecting program stored in the CD-ROM 110 is uploaded to the personal computer 30 and stored in the hard disk device 313 so that the personal computer 30 operates as the subject detecting apparatus of the present invention.

Figure 4:
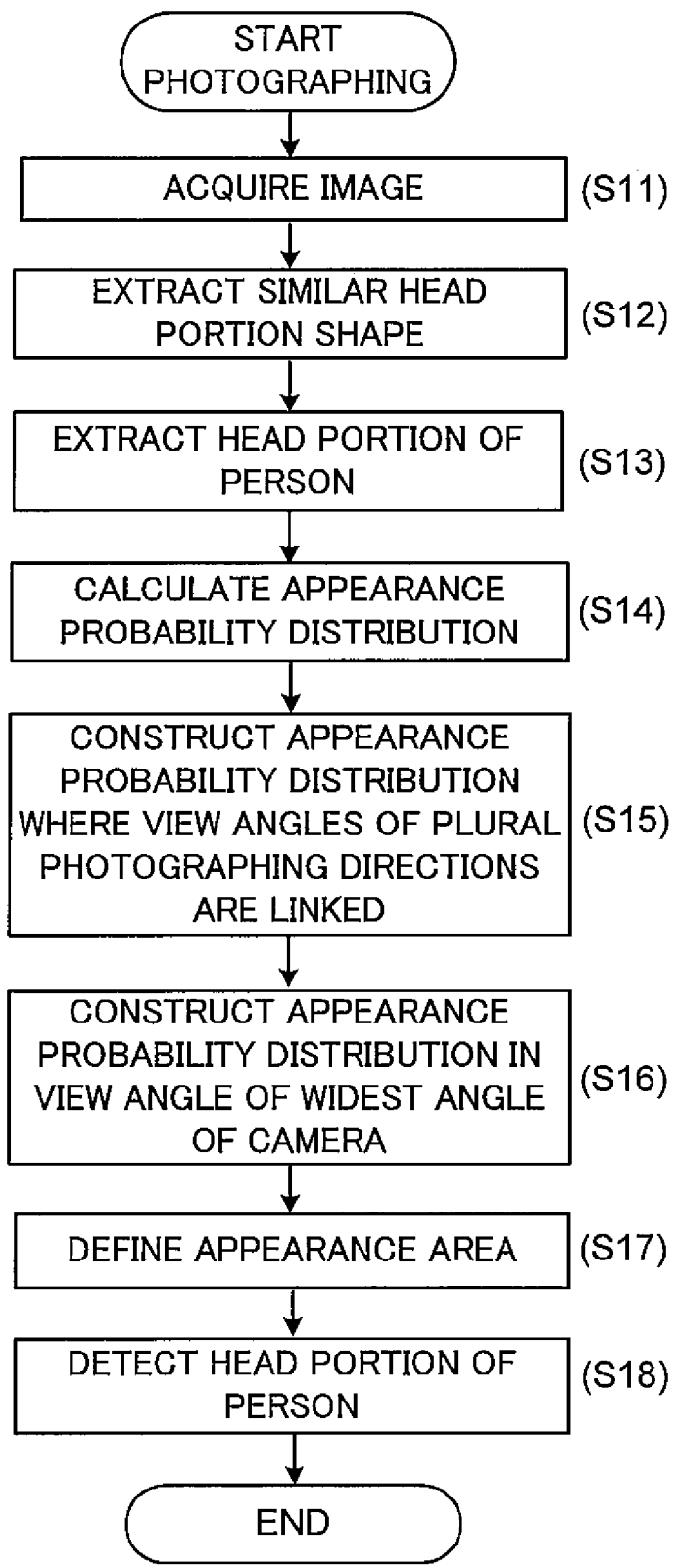
FIG. 4 is a flowchart illustrating a subject detecting method according to the first embodiment of the present invention.

FIG. 4 is a flowchart illustrating a subject detecting method according to the first embodiment of the present invention.

The subject detecting method constructs, based on plural images constituting moving images obtained by repeatedly photographing a field using the fixedly disposed monitoring camera 10, an appearance probability distribution of the size of a head portion of a person with an upper part whose outline is in the shape of an approximately semicircle, which repeatedly appears in various sizes in the plural images, and detects the head portion of the person using the constructed appearance probability distribution. The subject detecting method includes an image acquiring step (step S11), an extracting step (step S12), a filtering step (step S13), a probability distribution calculating step (step S14), a first integrating step (step S15), a second integrating step (step S16), an appearance area defining step (step S17), and a subject detecting step (step S18).

Further, among these steps, the image acquiring step (step S11), the extracting step (step S12), the filtering step (step S13), the probability distribution calculating step (step S14), the first integrating step (step S15), and the second integrating step (step S16) are elements that compose the probability distribution constructing method according to the first embodiment of the present invention. The appearance area defining step (step S17) and the subject detecting step (step S18) are not included.

The steps of the subject detecting method shown in FIG. 4 will be described later in detail.

Figure 5:
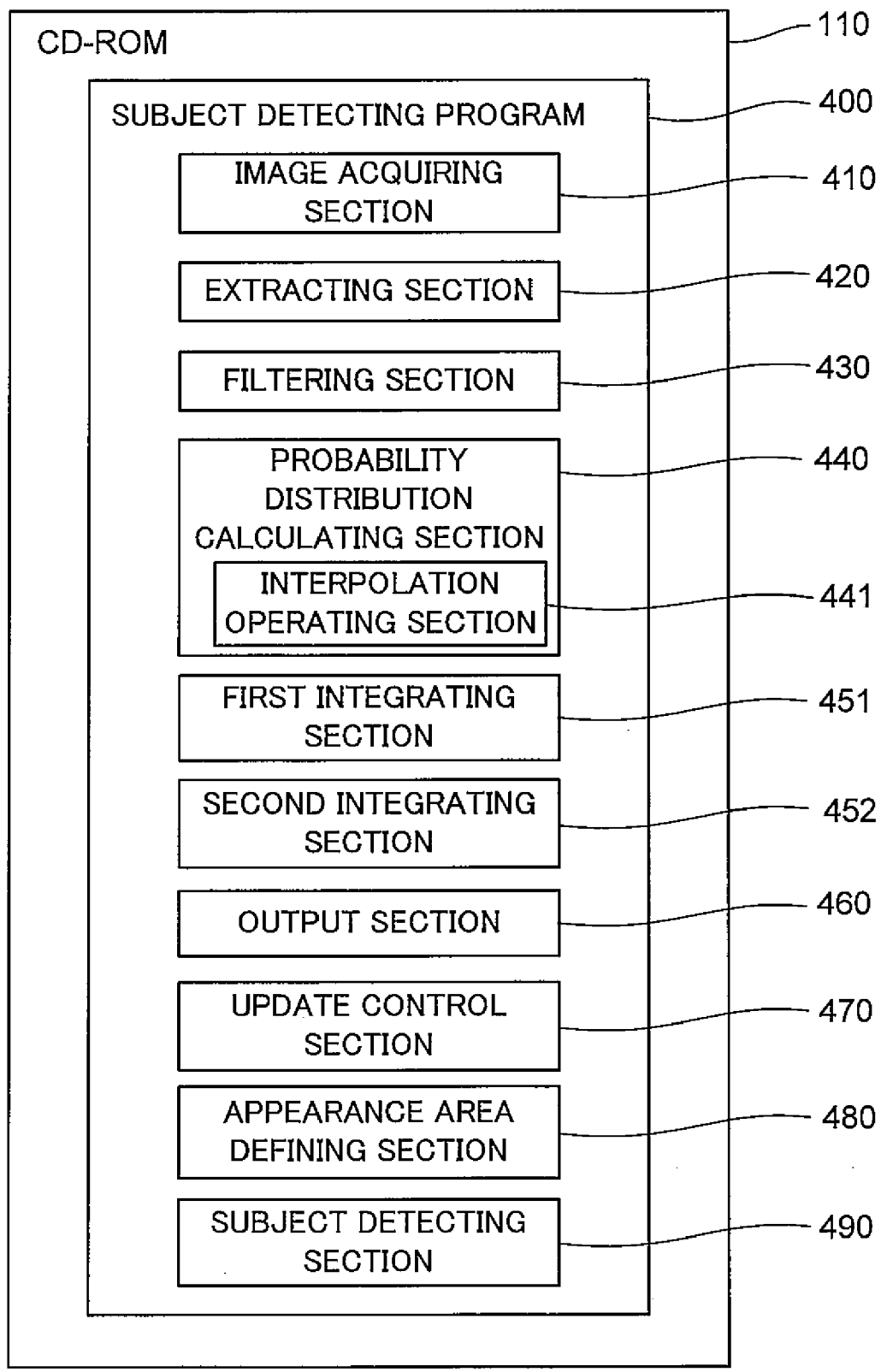
FIG. 5 is a diagram illustrating a subject detecting program according to the first embodiment of the present invention.

FIG. 5 is a diagram illustrating a subject detecting program 400 according to the first embodiment of the present invention.

The subject detecting program 400 shown in FIG. 5 is stored in the CD-ROM 110 illustrated in FIG. 3.

The subject detecting program 400 is executed in the personal computer 30 shown in FIGS. 1, 2 and 3, and allows the personal computer 30 to operate as the subject detecting apparatus according to the first embodiment of the present invention that constructs, based on plural images obtained by repeatedly photographing a field using the fixedly disposed monitoring camera 10, an appearance probability distribution of the size of a head portion of a person with an upper part whose outline is in the shape of an approximately semicircle, which repeatedly appears in various sizes in the plural images, and detects the head portion of the person using the constructed appearance probability distribution. The subject detecting program 400 includes an image acquiring section 410, an extracting section 420, a filtering section 430, a probability distribution calculating section 440, a first integrating section 451, a second integrating section 452, an output section 460, an update control section 470, an appearance area defining section 480, and a subject detecting section 490. In addition, the probability distribution calculating section 440 has an interpolation operating section 441.

Further, among the program components constructed by the subject detecting program 400, the image acquiring section 410, the extracting section 420, the filtering section 430, the probability distribution calculating section 440, the interpolation operating section 441, the first integrating section 451, the second integrating section 452, the output section 460, and the update control section 470 are program components that compose the probability distribution constructing program according to the first embodiment of the present invention. The appearance are a defining section 480 and the subject detecting section 490 are not included.

Further, among the program components constructed by the subject detecting program 400, the image acquiring section 410, the extracting section 420, the filtering section 430, the probability distribution calculating section 440, the first integrating section 451, the second integrating section 452, the appearance area defining section 480, and the subject detecting section 490 are program components for executing the image acquiring step (step S11), the extracting step (step S12), the filtering step (step S13), the probability distribution calculating step (step S14), the first integrating step (step S15), the second integrating step (step S16), the appearance area defining step (step S17), and the subject detecting step (step S18) of the subject detecting method shown in FIG. 4, respectively, when the subject detecting program 400 is installed and executed in the personal computer 30 shown in FIGS. 1, 2 and 3.

The functions of the elements of the subject detecting program 400 will be described later.

Figure 6:
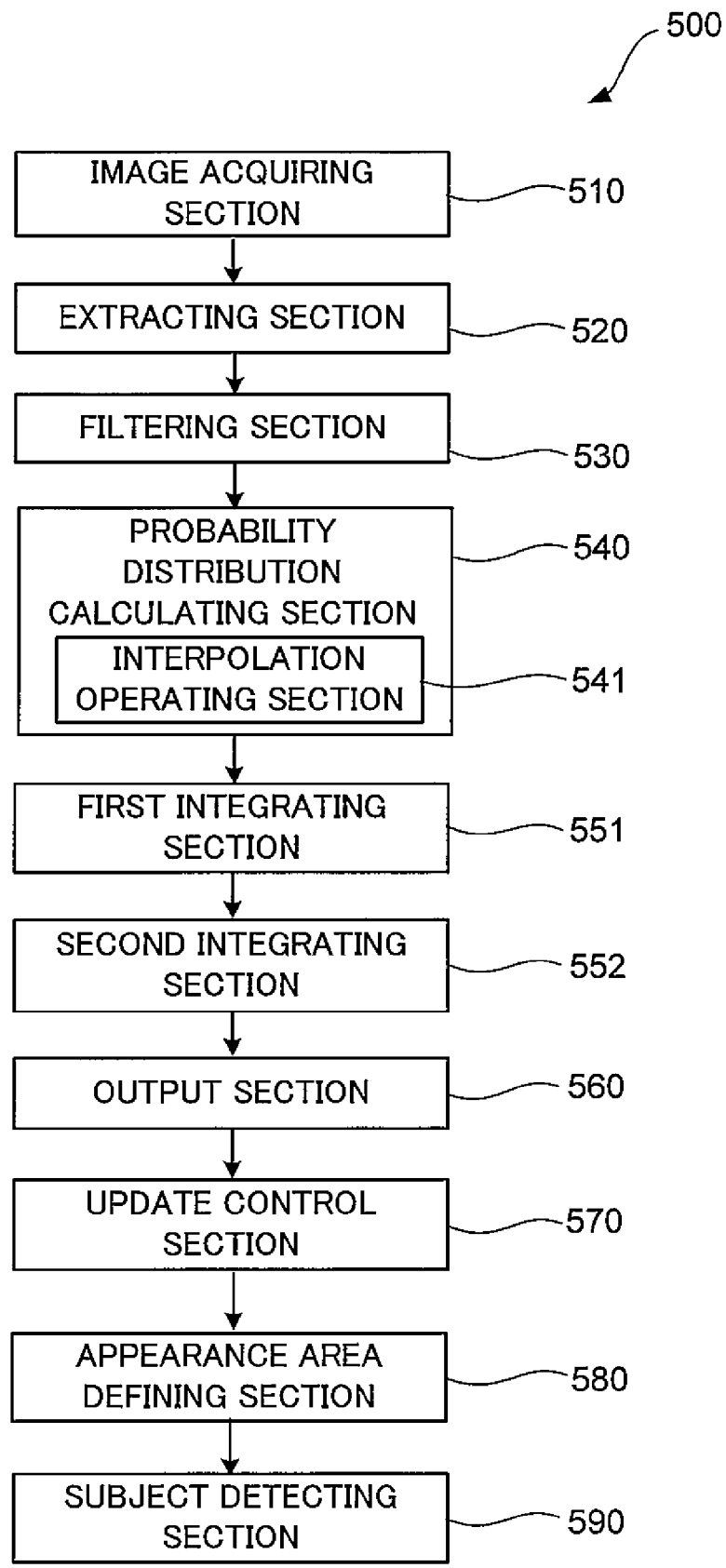
FIG. 6 is a functional block diagram illustrating a subject detecting apparatus according to the first embodiment of the present invention.

FIG. 6 is a functional block diagram illustrating a subject detecting apparatus 500 according to the first embodiment of the present invention.

The subject detecting apparatus 500 shown in FIG. 6 is realized when the subject detecting program 400 shown in FIG. 5 is loaded in the personal computer 30 shown in FIGS. 1, 2 and 3 and the subject detecting program 400 is executed in the personal computer 30.

The subject detecting apparatus 500 shown in FIG. 6 constructs, based on plural images obtained by repeatedly photographing a field using the fixedly disposed monitoring camera 10, an appearance probability distribution of the size of a head portion of a person with an upper part whose outline is in the shape of an approximately semicircle, which repeatedly appears in various sizes in the plural images, and detects the head portion of the person using the constructed appearance probability distribution. The subject detecting apparatus 500 includes an image acquiring section 510, an extracting section 520, a filtering section 530, a probability distribution calculating section 540, a first integrating section 551, a second integrating section 552, an output section 560, an update control section 570, an appearance area defining section 580, and a subject detecting section 590. In addition, the probability distribution calculating section 540 includes an interpolation operating section 541.

Further, among the elements included in the subject detecting apparatus 500, the image acquiring section 510, the extracting section 520, the filtering section 530, the probability distribution calculating section 540, the interpolation operating section 541, the first integrating section 551, the second integrating section 552, the output section 560, and the update control section 570 are elements that compose the probability distribution constructing apparatus according to the first embodiment of the present invention. The appearance area defining section 580 and the subject detecting section 590 are not included.

The image acquiring section 510, the extracting section 520, the filtering section 530, the probability distribution calculating section 540, the interpolation operating section 541, the first integrating section 551, the second integrating section 552, the output section 560, the update control section 570, the appearance area defining section 580, and the subject detecting section 590 included in the subject detecting apparatus 500 are configured by combining the image acquiring section 410, the extracting section 420, the filtering section 430, the probability distribution calculating section 440, the interpolation operating section 441, the first integrating section 451, the second integrating section 452, the output section 460, the update control section 470, the appearance area defining section 480, and the subject detecting section 490, which serve as the program components of the subject detecting program 400 shown in FIG. 5, with the hardware and an OS (Operation System) or an application program of the personal computer 30 shown in FIGS. 1, 2 and 3, which are required to realize the respective functions of the program components.

Next, the steps of the subject detecting method shown in FIG. 4, the program components of the subject detecting program 400 shown in FIG. 5, and the elements of the subject detecting apparatus 500 shown in FIG. 6 will be described.

Further, the steps of the image acquiring step (step S11), the extracting step (step S12), the filtering step (step S13), the probability distribution calculating step (step S14), the first integrating step (step S15), the second integrating step (step S16), the appearance area defining step (step S17), and the subject detecting step (step S18) of the subject detecting method that are shown in FIG. 4 respectively correspond to the image acquiring section 510, the extracting section 520, the filtering section 530, the probability distribution calculating section 540, the interpolation calculating section 541, the first integrating section 551, the second integrating section 552, the appearance area defining section 580, and the subject detecting section 590, except for the output section 560 and the update control section 570, among the elements included in the subject detecting apparatus 500 shown in FIG. 6. In addition, the program components of the subject detecting program 400 shown in FIG. 5 respectively correspond to the elements of the subject detecting apparatus 500 shown in FIG. 6.

Accordingly, in the following, the description of the steps of the subject detecting method shown in FIG. 4 and the description of the program components of the subject detecting program 400 shown in FIG. 5 will also serve as the description of the elements of the subject detecting apparatus 500 shown in FIG. 6.

In addition, as described above, among the elements included in the subject detecting apparatus 500, the image acquiring section 510, the extracting section 520, the filtering section 530, the probability distribution calculating section 540, the interpolation operating section 541, the first integrating section 551, the second integrating section 552, the output section 560, and the update control section 570, except for the appearance area defining section 580 and the subject detecting section 590, are elements that compose the probability distribution constructing apparatus according to the first embodiment of the present invention. Accordingly, the description of these elements will also serve as the description of the probability distribution constructing apparatus according to the first embodiment of the present invention.

The conceptual functions of the elements of the subject detecting apparatus 500 will be described below, and the specific functions of the elements will be described later.

The image acquiring section 510 of the subject detecting apparatus 500 shown in FIG. 6 corresponds to the image acquiring step (step S11) of the subject detecting method shown in FIG. 4, and also corresponds to the image acquiring section 410 of the subject detecting program 400 shown in FIG. 5 in terms of application software. The image acquiring section 510 acquires the plural images, which are obtained by repeatedly photographing a field using the fixedly disposed monitoring camera 10, from the monitoring camera 10. The image acquiring section 510 is an example of the function of the image acquiring section in the present invention, and this function is mainly realized by the CPU 311 incorporated in the main device 31 of the personal computer 30 shown in FIGS. 1, 2 and 3 and executing the image acquiring section 410 (refer to FIG. 5) serving as a program component.

The function of each element of the subject detecting apparatus 500, which will be described below, is also mainly realized by the CPU 311 incorporated in the main device 31 of the personal computer 30 shown in FIGS. 1, 2 and 3. Accordingly, the hardware of each of these elements will not be described to avoid repetitive description.

Further, the extracting section 520 of the subject detecting apparatus 500 shown in FIG. 6 is an element that corresponds to the extracting step (step S12) of the subject detecting method shown in FIG. 4 and also corresponds to the extracting section 420 of the subject detecting program 400 shown in FIG. 5 in terms of application software. The extracting section 520 extracts, from plural images acquired by the image acquiring section 510, a head portion shape similar to the shape of the head portion of a person having an upper part whose outline is in the shape of an approximately semicircle, which repeatedly appears in various sizes in the plural images, together with the size of the similar head portion shape and information about a position in a view angle of the monitoring camera 10. In addition, when the extracting section 520 extracts the similar head portion shape, the extracting section 520 calculates an evaluation value that indicates a degree of the possibility that the similar head portion shape belongs to the head portion of the extraction target. The extracting section 520 then extracts only the similar head portion shape for which there is obtained an evaluation value that is higher, in terms of the possibility that the similar head portion shape belongs to the head portion of the extraction target, than a threshold value set to allow leakage from extraction of the head portion of the extraction target. The extracting section 520 shows an example of the function of the extracting section in the present invention.

In addition, the filtering section 530 of the subject detecting apparatus 500 shown in FIG. 6 is an element that corresponds to the filtering step (step S13) of the subject detecting method shown in FIG. 4 and also corresponds to the filtering section 430 of the subject detecting program 400 shown in FIG. 5 in terms of application software. The filtering section 530 determines whether the similar head portion shape extracted by the extracting section 520 belongs to the head portion of the person, and extracts the head portion of the person. In addition, the filtering section 530 counts the number of other similar head portion shapes classified as having the same size as a similar head portion shape in a search area having a predetermined size expanding around the similar head portion shape in the view angle, with respect to each similar head portion shape extracted by the extracting section 520, and extracts the similar head portion shape as the head portion of the person, only when a value obtained by the counting is equal to or larger than a threshold value. The filtering section 530 shows an example of the function of the filtering section in the present invention.

Further, the probability distribution calculating section 540 of the subject detecting apparatus 500 shown in FIG. 6 is an element that corresponds to the probability distribution calculating step (step S14) of the subject detecting method shown in FIG. 4, and also corresponds to the probability distribution calculating section 440 of the subject detecting program 400 shown in FIG. 5 in terms of application software. The probability distribution calculating section 540 calculates an appearance probability distribution of the size of the head portion extracted by the filtering section 530. In addition, the probability distribution calculating section 540 calculates, for each of plural sizes of the head portion of the person, an appearance location probability distribution where the head portion in one size of the person appears in each location within the view angle. The probability distribution calculating section 540 is an example of the function of the probability distribution calculating section in the present invention.

In addition, the interpolation operating section 541 included in the probability distribution calculating section 540 of the subject detecting apparatus 500 shown in FIG. 6 is an element that corresponds to the probability distribution calculating step (step S14) of the subject detecting method shown in FIG. 4, and also corresponds to the interpolation operating section 441 of the subject detecting program 400 shown in FIG. 5 in terms of application software. The interpolation operating section 541 calculates an appearance location probability distribution of a head portion in a predetermined size using an interpolation operation, based on an appearance location probability distribution of a head portion in a size different from the predetermined size. The interpolation operating section 541 is an example of the function of the interpolation operating section in the present invention.

Further, the first integrating section 551 of the subject detecting apparatus 500 shown in FIG. 6 is an element that corresponds to the first integrating step (step S15) of the subject detecting method shown in FIG. 4, and also corresponds to the first integrating section 451 of the subject detecting program 400 shown in FIG. 5 in terms of application software. The first integrating section 551 integrates appearance probability distributions obtained by photographing in plural photographing directions, thereby constructing an appearance probability distribution in a view angle formed by linking the view angles of these plural photographing directions. The first integrating section 551 is an example of the function of the integrating section in the present invention.

Further, the second integrating section 552 of the subject detecting apparatus 500 shown in FIG. 6 is an element that corresponds to the second integrating step (step S16) of the subject detecting method shown in FIG. 4, and also corresponds to the second integrating section 452 of the subject detecting program 400 shown in FIG. 5 in terms of application software. The second integrating section 552 constructs an appearance probability distribution in a view angle of a widest angle of the monitoring camera 10, by integrating appearance probability distributions obtained by photographing using plural focal distances. The second integrating section 552 is an example of the function of the integrating section in the present invention.

Further, the output section 560 of the subject detecting apparatus 500 shown in FIG. 6 is an element that corresponds to the output section 460 of the subject detecting program 400 shown in FIG. 5 in terms of application software, and outputs the appearance probability distribution calculated by the probability distribution calculating section 540. The output section 560 is an example of the function of the output section in the present invention.

Further, the update control section 570 of the subject detecting apparatus 500 shown in FIG. 6 is an element that corresponds to the update control section 470 of the subject detecting program 400 shown in FIG. 5 in terms of application software. The update control section 570 causes the image acquiring section 510 to acquire an image even after the appearance probability distribution is constructed, and also causes the extracting section 520 and the filtering section 530 to operate for the newly acquired image. The update control section 570 then causes the probability distribution calculating section 540 to update the appearance probability distribution by adding thereto information about the head portion of the person extracted from the new image. The update control section 570 is an example of the function of the update control section in the present invention.

Further, the appearance area defining section 580 of the subject detecting apparatus 500 shown in FIG. 6 is an element that corresponds to the appearance area defining step (step S17) of the subject detecting method shown in FIG. 4, and also corresponds to the appearance area defining section 480 of the subject detecting program 400 shown in FIG. 5 in terms of application software. The appearance area defining section 580 defines an appearance area for each size of the head portion of the person appearing in the view angle of the monitoring camera 10, on the basis of the appearance probability distribution calculated by the probability distribution calculating section 540. The appearance area defining section 580 is an example of the function of the appearance area defining section in the present invention.

Further, the subject detecting section 590 of the subject detecting apparatus 500 shown in FIG. 6 is an element that corresponds to the subject detecting step (step S18) of the subject detecting method shown in FIG. 4, and also corresponds to the subject detecting section 490 of the subject detecting program 400 shown in FIG. 5 in terms of application software. The subject detecting section 590 detects a head portion of the person appearing as the similar head portion shape having the size, within the appearance area according to the size in the images obtained by new photographing by the monitoring camera 10. The subject detecting section 590 is an example of the function of the subject detecting section in the present invention.

Hereinafter, the subject detecting apparatus according to the first embodiment of the present invention will be specifically described.

Figure 7:
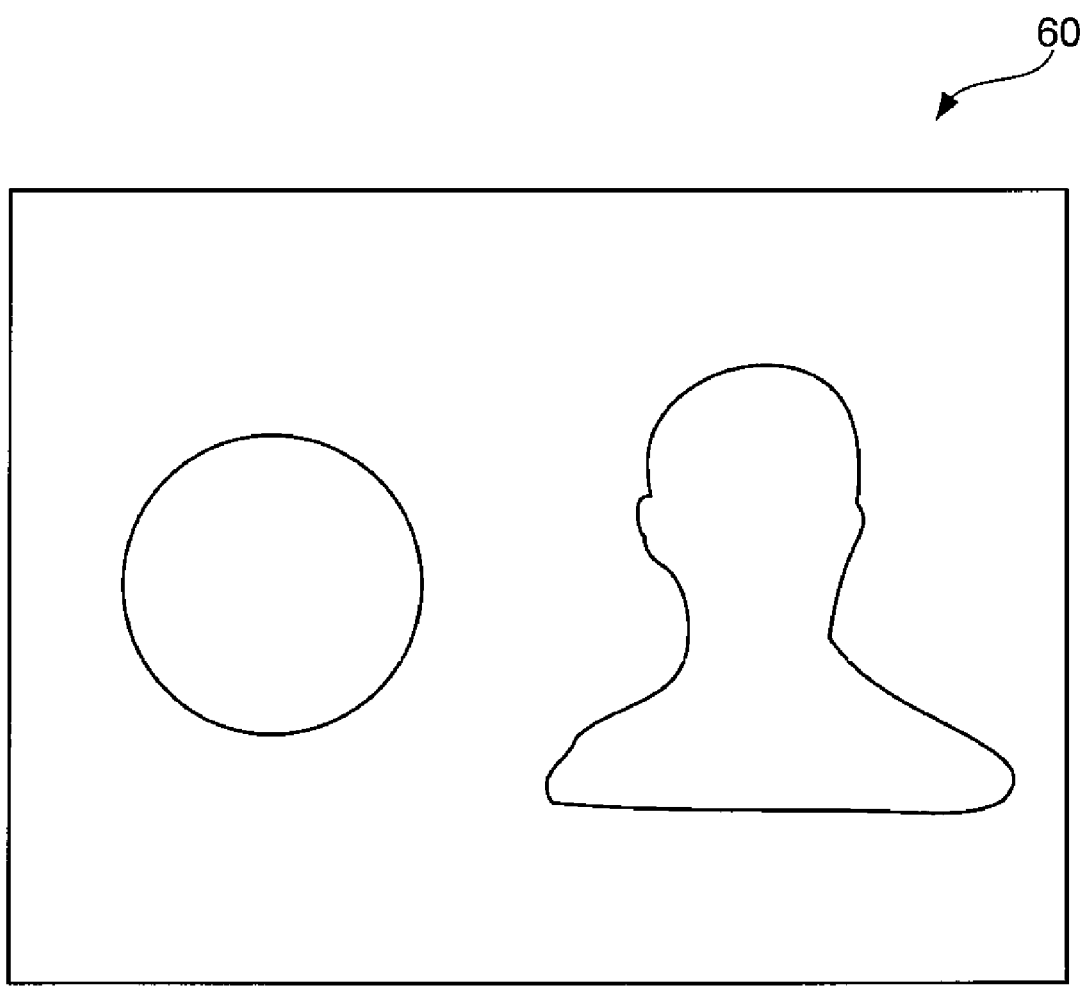
FIG. 7 is a diagram illustrating an example of an image that is acquired by an image acquiring section.

FIG. 7 is a diagram illustrating an example of an image acquired by an image acquiring section 510.

An image 60 shown in FIG. 7 indicates one frame of a moving image represented by image data, which is obtained by photographing the inside of the bank in a diagonally downward direction from the ceiling using the monitoring camera 10 fixed to the ceiling of the bank. The monitoring camera 10 is connected to the Internet 20, and the image data is transmitted from the monitoring camera 10 to the personal computer 30 through network communication. That is, the image 60 is one of plural images that are obtained by repeatedly photographing a field using the monitoring camera 10 and then acquired by the image acquiring section 510 included in the subject detecting apparatus 500 that is realized when the subject detecting program 400 is executed in the personal computer 30.

Next, referring to FIGS. 8 to 16, the extracting section 520 included in the subject detecting apparatus 500 will be described.

Figure 8:
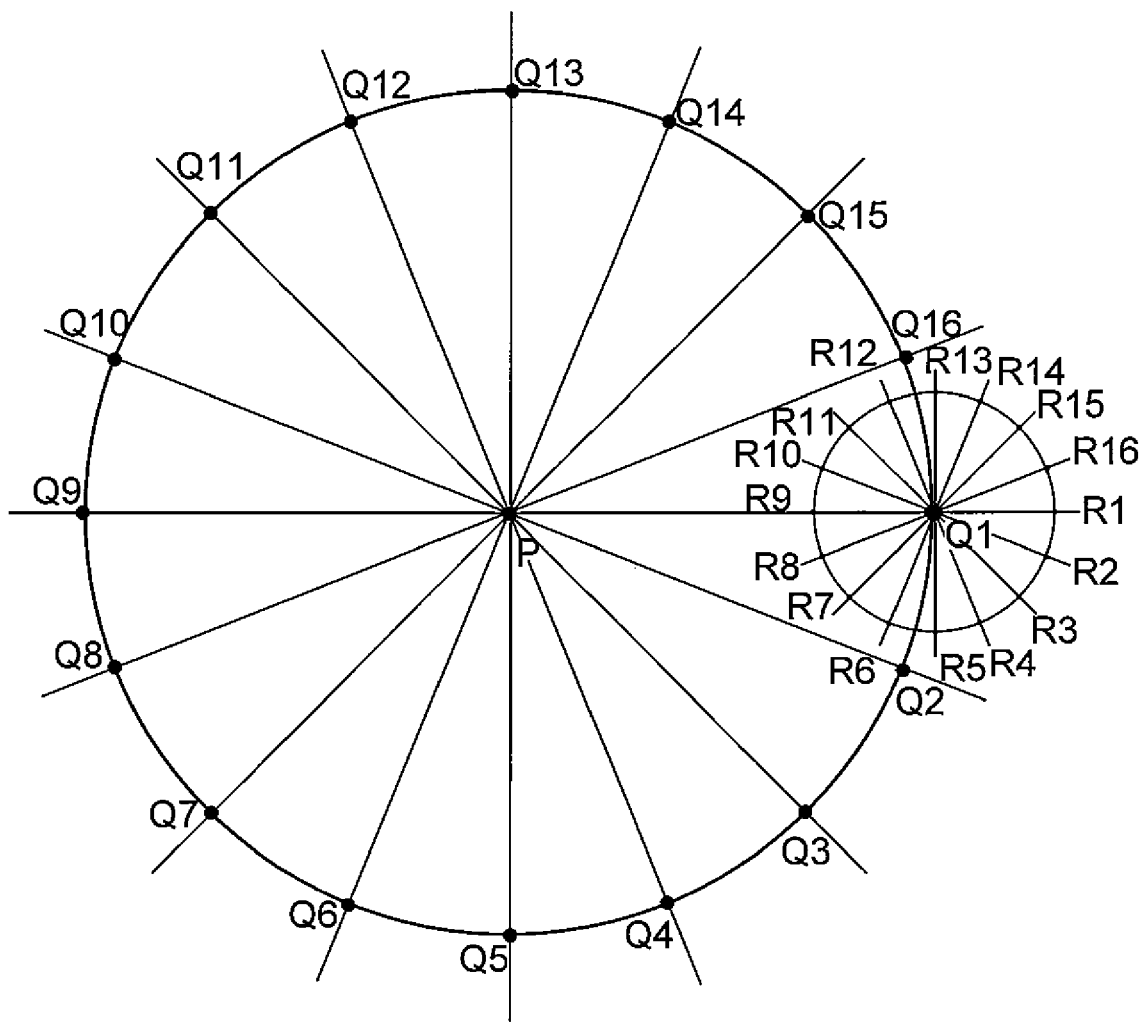
FIG. 8 is a conceptual diagram illustrating a target pixel P, evaluation pixels Q1 to Q16, and gradient calculation pixels R1 to R16 among plural pixels that represent an image shown in FIG. 7.

FIG. 8 is a conceptual diagram illustrating a target pixel P, evaluation pixels Q1 to Q16, and gradient calculation pixels R1 to R16 among plural pixels that represent an image 60 shown in FIG. 7.

FIG. 8 shows the target pixel P that is one of plural pixels representing the image 60 shown in FIG. 7. FIG. 8 also shows the sixteen evaluation pixels Q1 to Q16 uniformly spaced along the circle with the target pixel P at the center to surround the target pixel P. In addition, FIG. 8 shows the sixteen gradient calculation pixels R1 to R16 uniformly spaced along the circle with the evaluation pixel Q1 among the sixteen evaluation pixels Q1 to Q16 at the center to surround the evaluation pixel Q1.

First, when a pixel evaluation value to evaluate whether each of the evaluation pixels over an entire area of the image 60 shown in FIG. 7 is a pixel on a semicircle of 180° with a predetermined target pixel as its center is calculated for each of the evaluation pixels, a gradient direction where a luminance value on the image 60 varies is calculated for each of the evaluation pixels Q1 to Q16. In addition, there are other types of evaluation pixels such as evaluation pixels arranged along a circle with the target pixel P as its center to surround the target pixel P and having a radius different from the radius of the circle shown in FIG. 8, and evaluation pixels that surround a target pixel positioned at a location different from the position of the target pixel P shown in FIG. 8 and selected from plural pixels representing the image 60 shown in FIG. 7. For each of these other types of evaluation pixels, a gradient direction where a luminance value on the image 60 varies is calculated. In this way, a gradient direction is calculated for each of the evaluation pixels over the entire area of the image 60 shown in FIG. 7. Now, there will be described a process of calculating a gradient direction for one evaluation pixel Q1 among the sixteen evaluation pixels Q1 to Q16 arranged along the circle with the target pixel P as its center to surround the target pixel P as shown in FIG. 8.

Each gradient value is calculated on the basis of a difference between a luminance value of the evaluation pixel Q1 and a luminance value of each of the sixteen gradient calculation pixels R1 to R16 that circumferentially surround the evaluation pixel Q1.

Figure 9:
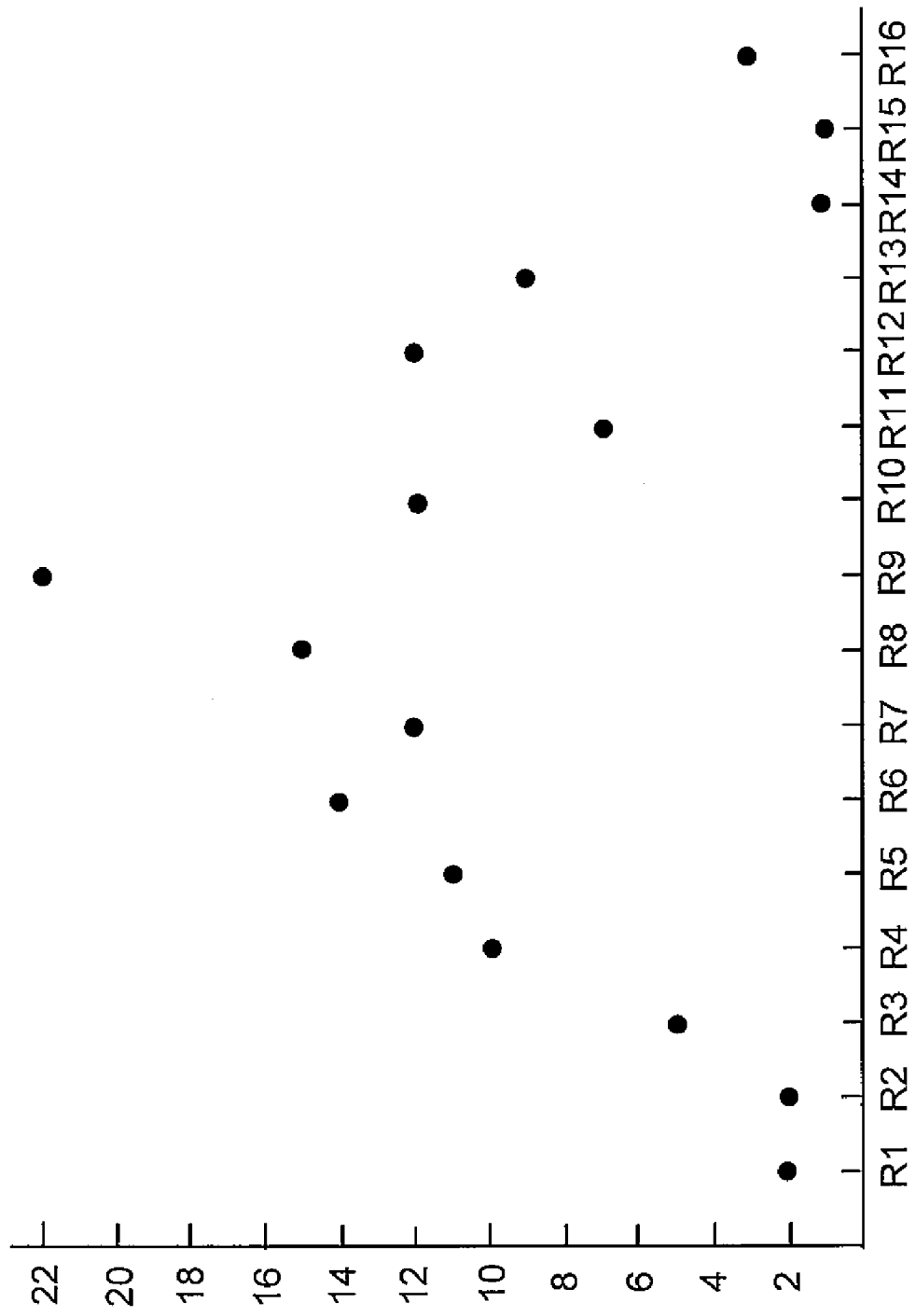
FIG. 9 is a diagram illustrating a group of gradient values corresponding to gradient calculation pixels R1 to R16 when the gradient calculation pixels R1 to R16 are arranged in the order that circumferentially surrounds an evaluation pixel Q1.

FIG. 9 shows a gradient value group of the gradient values corresponding to the sixteen gradient calculation pixels R1 to R16 when the sixteen gradient calculation pixels R1 to R16 are arranged in the order of circumferentially surrounding the evaluation pixel Q1. The horizontal axis indicates the gradient calculation pixels R1 to R16 and the vertical axis indicates the gradient values.

As shown in FIG. 9, in regards to the calculated gradient values that constitute the gradient value group, a gradient value that corresponds to the gradient calculation pixel R1 is "2.0", a gradient value that corresponds to the gradient calculation pixel R2 is "2.0", a gradient value that corresponds to the gradient calculation pixel R3 is "5.0", a gradient value that corresponds to the gradient calculation pixel R4 is "10.0", a gradient value that corresponds to the gradient calculation pixel R5 is "11.0", a gradient value that corresponds to the gradient calculation pixel R6 is "14.0", a gradient value that corresponds to the gradient calculation pixel R7 is "12.0", a gradient value that corresponds to the gradient calculation pixel R8 is "15.0", a gradient value that corresponds to the gradient calculation pixel R9 is "22.0", a gradient value that corresponds to the gradient calculation pixel R10 is "12.0", a gradient value that corresponds to the gradient calculation pixel R11 is "7.0", a gradient value that corresponds to the gradient calculation pixel R12 is "12.0", a gradient value that corresponds to the gradient calculation pixel R13 is "9.0", a gradient value that corresponds to the gradient calculation pixel R14 is "1.0", a gradient value that corresponds to the gradient calculation pixel R15 is "1.0", and a gradient value that corresponds to the gradient calculation pixel R16 is "3.0".

In this case, in order to remove a noise of each of the calculated gradient values, a smoothing gradient value group is generated by applying a smoothing process to the gradient value group shown in FIG. 9.

Here, as the smoothing process, a high value suppressing process, a movement average process to suppress a noise (this movement average process will be hereinafter referred to as a first movement average process), a quantizing process, and a movement average process to allow a smoothing gradient value having a unique maximum value to appear (this movement average process will be hereinafter referred to as a second movement average process) are sequentially executed.

Figure 10:
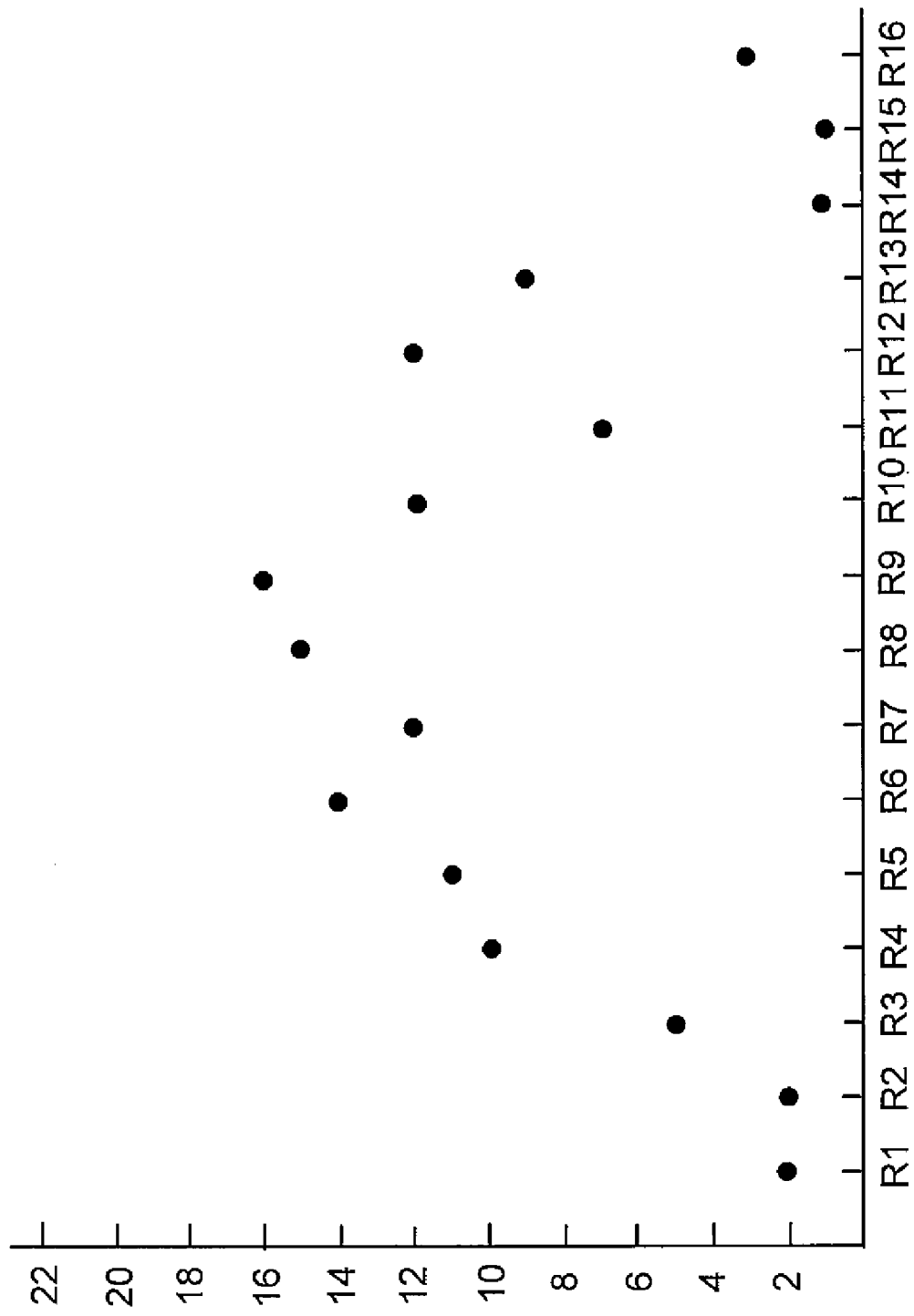
FIG. 10 is a diagram illustrating a group of smoothing gradient values that are generated by applying a high value suppressing process to the gradient value group shown in FIG. 9.

FIG. 10 is a diagram illustrating a smoothing gradient value group that is generated by applying the high value suppressing process to the gradient value group shown in FIG. 9. The horizontal axis indicates the gradient calculation pixels R1 to R16 and the vertical axis indicates the gradient values.

In this case, as a threshold value of the gradient values that is used when the high value suppressing process is executed, a threshold value "16.0" is set. The gradient value that exceeds the value "16.0" set as the threshold value of the gradient values that constitute the gradient value group shown in FIG. 9 is replaced by the threshold value "16.0", thereby generating a new smoothing gradient value group. Here, since the gradient value that corresponds to the gradient calculation pixel R9 exceeds the threshold value "16.0", the gradient value "22.0" that corresponds to the gradient calculation pixel R9 is replaced by the smoothing gradient value "16.0". As shown in FIG. 10, in regards to the smoothing gradient values that constitute the generated smoothing gradient value group, a smoothing gradient value that corresponds to the gradient calculation pixel R1 is "2.0", a smoothing gradient value that corresponds to the gradient calculation pixel R2 is "2.0", a smoothing gradient value that corresponds to the gradient calculation pixel R3 is "5.0", a smoothing gradient value that corresponds to the gradient calculation pixel R4 is "10.0", a smoothing gradient value that corresponds to the gradient calculation pixel R5 is "11.0", a smoothing gradient value that corresponds to the gradient calculation pixel R6 is "14.0", a smoothing gradient value that corresponds to the gradient calculation pixel R7 is "12.0", a smoothing gradient value that corresponds to the gradient calculation pixel R8 is "15.0", a smoothing gradient value that corresponds to the gradient calculation pixel R9 is "16.0", a smoothing gradient value that corresponds to the gradient calculation pixel R10 is "12.0", a smoothing gradient value that corresponds to the gradient calculation pixel R11 is "7.0", a smoothing gradient value that corresponds to the gradient calculation pixel R12 is "12.0", a smoothing gradient value that corresponds to the gradient calculation pixel R13 is "9.0", a smoothing gradient value that corresponds to the gradient calculation pixel R14 is "1.0", a smoothing gradient value that corresponds to the gradient calculation pixel R15 is "1.0", and a smoothing gradient value that corresponds to the gradient calculation pixel R16 is "3.0".

Figure 11:
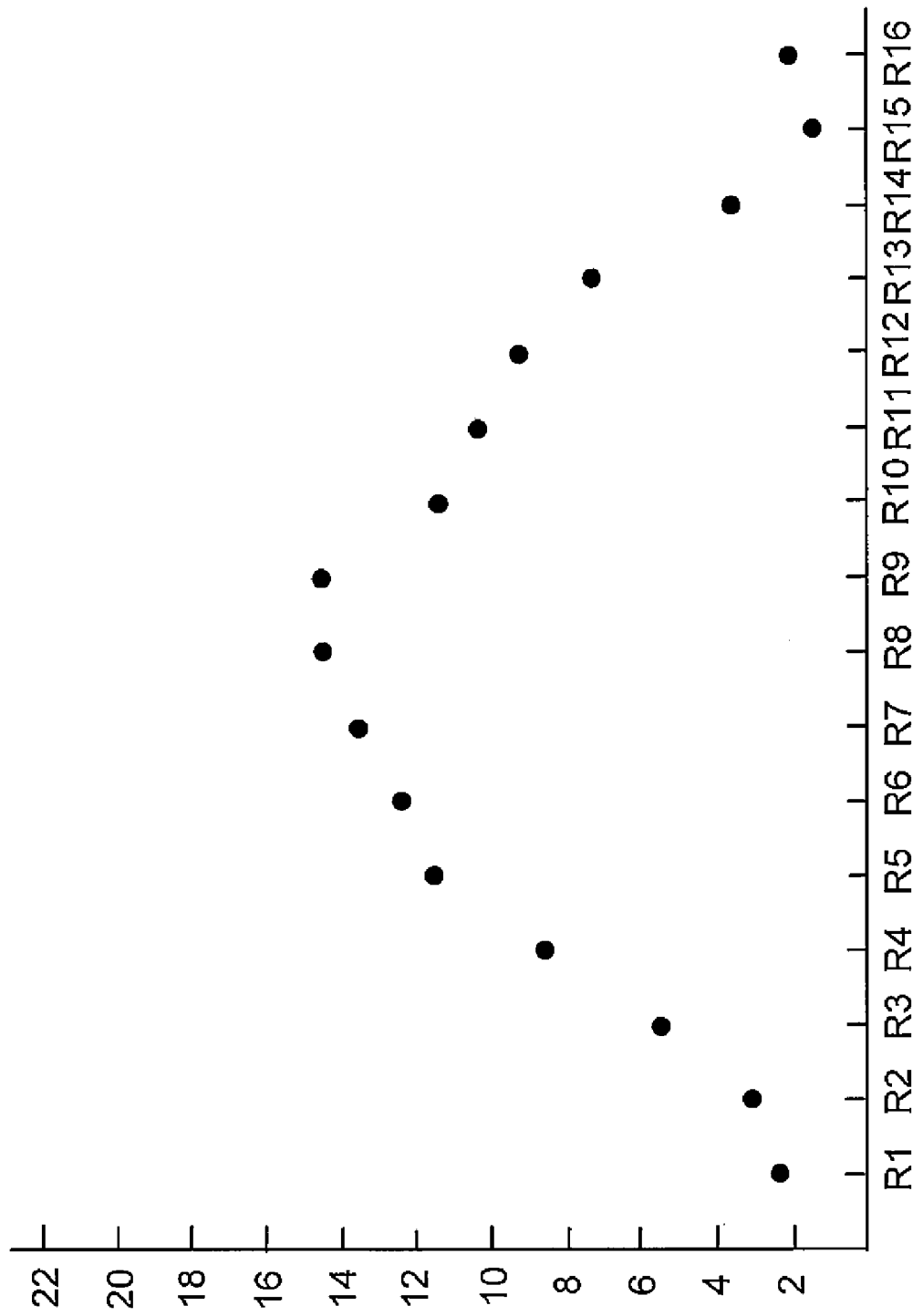
FIG. 11 is a diagram illustrating a smoothing gradient value group that is generated by applying a first movement average process to the smoothing gradient value group shown in FIG. 10.

FIG. 11 is a diagram illustrating a smoothing gradient value group that is generated by applying the first movement average process to a smoothing gradient value group shown in FIG. 10. The horizontal axis indicates the gradient calculation pixels R1 to R16 and the vertical axis indicates the gradient values.

A new smoothing gradient value group is generated by applying the first movement average process to the smoothing gradient value group obtained after the high value suppressing process is executed. Here, with respect to the gradient calculation pixel to which the movement average process is to be applied, the three smoothing gradient values including one anterior smoothing gradient value and one posterior smoothing gradient value and a smoothing gradient value corresponding to the gradient calculation pixel are used to calculate an average of the three smoothing gradient values. As described above, since the smoothing process is applied to the gradient value group of the gradient values corresponding to the sixteen gradient calculation pixels R1 to R16 when the sixteen gradient calculation pixels R1 to R16 are arranged in the order of circumferentially surrounding the evaluation pixel Q1, one anterior smoothing gradient value and one posterior smoothing gradient value of the smoothing gradient value of the gradient calculation pixel R1 are smoothing gradient values that correspond to the gradient calculation pixel R16 and the gradient calculation pixel R2. Similarly, one anterior smoothing gradient value and one posterior smoothing gradient value of the smoothing gradient value of the gradient calculation pixel R16 are smoothing gradient values that correspond to the gradient calculation pixel R15 and the gradient calculation pixel R1. As shown in FIG. 11, in regards to the smoothing gradient values that constitute the generated smoothing gradient value group, a smoothing gradient value that corresponds to the gradient calculation pixel R1 is "2.3", a smoothing gradient value that corresponds to the gradient calculation pixel R2 is "3.0", a smoothing gradient value that corresponds to the gradient calculation pixel R3 is "5.7", a smoothing gradient value that corresponds to the gradient calculation pixel R4 is "8.7", a smoothing gradient value that corresponds to the gradient calculation pixel R5 is "11.7", a smoothing gradient value that corresponds to the gradient calculation pixel R6 is "12.3", a smoothing gradient value that corresponds to the gradient calculation pixel R7 is "13.7", a smoothing gradient value that corresponds to the gradient calculation pixel R8 is "14.3", a smoothing gradient value that corresponds to the gradient calculation pixel R9 is "14.3", a smoothing gradient value that corresponds to the gradient calculation pixel R10 is "11.7", a smoothing gradient value that corresponds to the gradient calculation pixel R11 is "10.3", a smoothing gradient value that corresponds to the gradient calculation pixel R12 is "9.3", a smoothing gradient value that corresponds to the gradient calculation pixel R13 is "7.3", a smoothing gradient value that corresponds to the gradient calculation pixel R14 is "3.7", a smoothing gradient value that corresponds to the gradient calculation pixel R15 is "1.7", and a smoothing gradient value that corresponds to the gradient calculation pixel R16 is "2.0".

Figure 12:
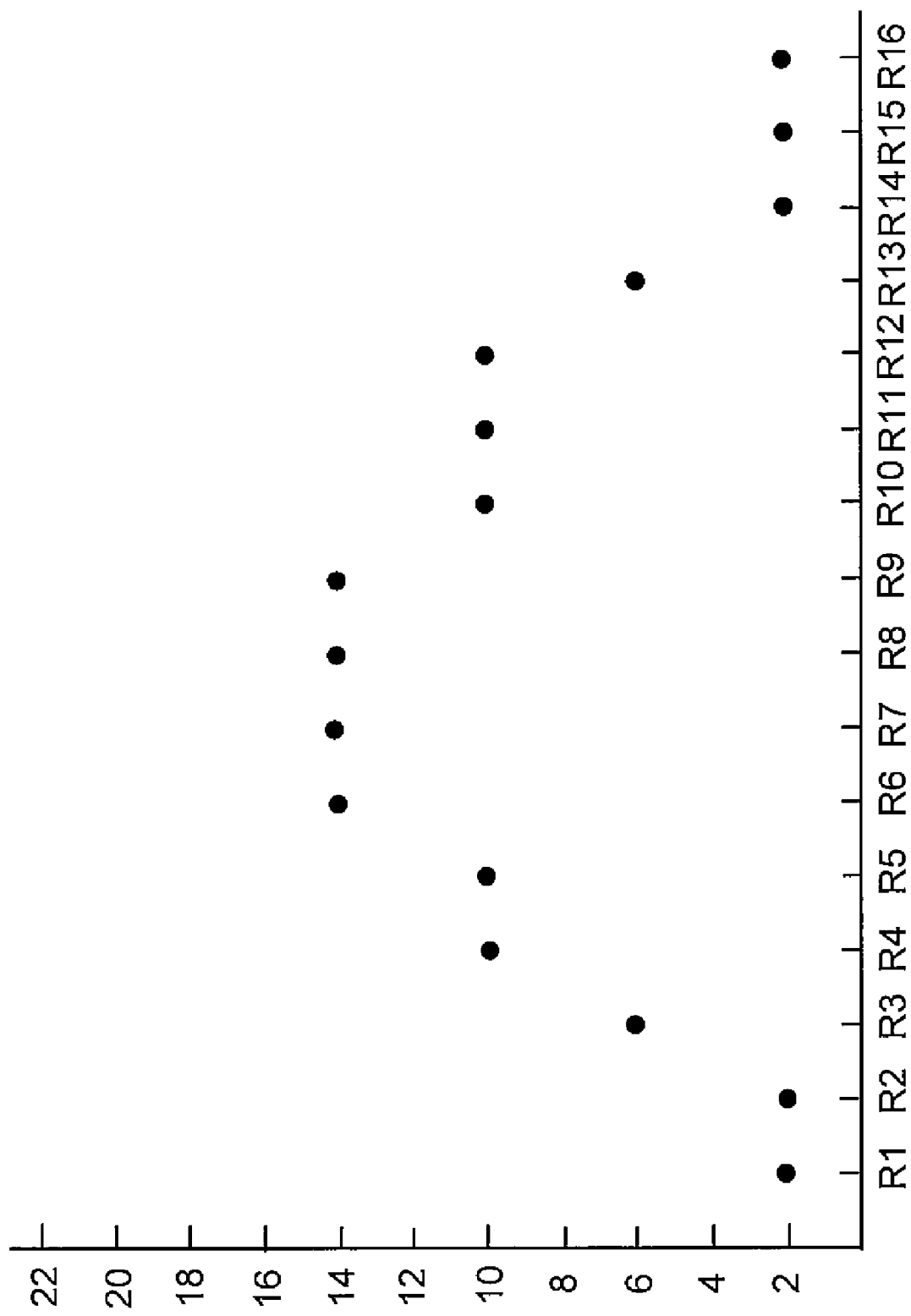
FIG. 12 is a diagram illustrating a smoothing gradient value group that is generated by applying a quantizing process to the smoothing gradient value group shown in FIG. 11.

FIG. 12 is a diagram illustrating a smoothing gradient value group that is generated by applying the quantizing process to a smoothing gradient value group shown in FIG. 11. The horizontal axis indicates the gradient calculation pixels R1 to R16 and the vertical axis indicates the gradient values.

A new smoothing gradient value group is generated by replacing each of the smoothing gradient values constituting the smoothing gradient value group obtained after execution of the first movement average process by any one of the plural smoothing gradient values that have values approximated to the smoothing gradient values and are discretely set. In this case, when each of the smoothing gradient values constituting the smoothing gradient value group obtained after the first movement average process is executed is larger than 0 and smaller than or equal to 4, each of the smoothing gradient values is replaced by "2". When each of the smoothing gradient values is larger than 4 and smaller than or equal to 8, each of the smoothing gradient values is replaced by "6". When each of the smoothing gradient values is larger than 8 and smaller than or equal to 12, each of the smoothing gradient values is replaced by "10". When each of the smoothing gradient values is larger than 12 and smaller than or equal to 16, each of the smoothing gradient values is replaced by "14". As shown in FIG. 12, in regards to the smoothing gradient values that constitute the generated smoothing gradient value group, a smoothing gradient value that corresponds to the gradient calculation pixel R1 is "2.0", a smoothing gradient value that corresponds to the gradient calculation pixel R2 is "2.0", a smoothing gradient value that corresponds to the gradient calculation pixel R3 is "6.0", a smoothing gradient value that corresponds to the gradient calculation pixel R4 is "10.0", a smoothing gradient value that corresponds to the gradient calculation pixel R5 is "10.0", a smoothing gradient value that corresponds to the gradient calculation pixel R6 is "14.0", a smoothing gradient value that corresponds to the gradient calculation pixel R7 is "14.0", a smoothing gradient value that corresponds to the gradient calculation pixel R8 is "14.0", a smoothing gradient value that corresponds to the gradient calculation pixel R9 is "14.0", a smoothing gradient value that corresponds to the gradient calculation pixel R10 is "10.0", a smoothing gradient value that corresponds to the gradient calculation pixel R11 is "10.0", a smoothing gradient value that corresponds to the gradient calculation pixel R12 is "10.0", a smoothing gradient value that corresponds to the gradient calculation pixel R13 is "6.0", a smoothing gradient value that corresponds to the gradient calculation pixel R14 is "2.0", a smoothing gradient value that corresponds to the gradient calculation pixel R15 is "2.0", and a smoothing gradient value that corresponds to the gradient calculation pixel R16 is "2.0".

Figure 13:
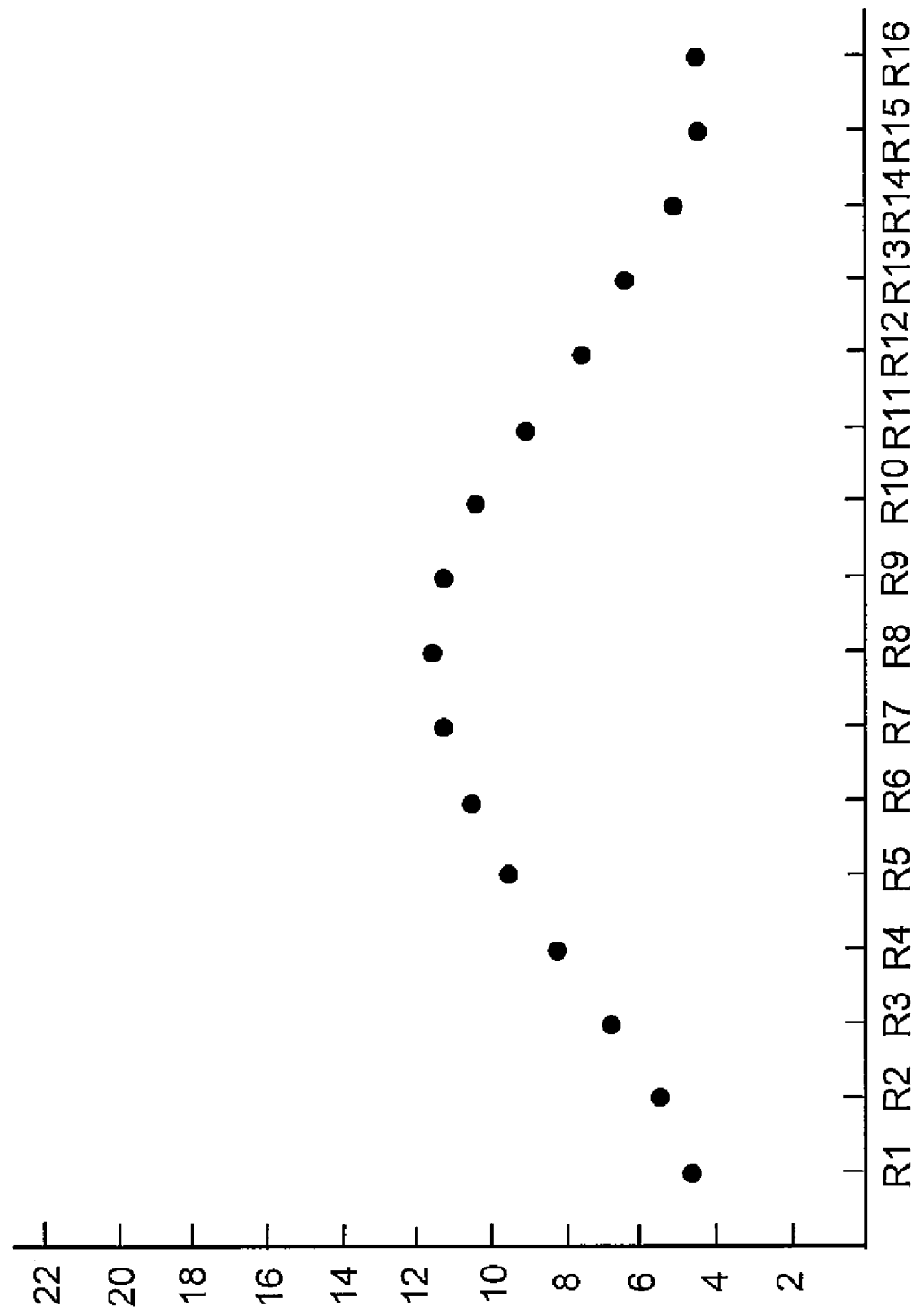
FIG. 13 is a diagram illustrating a smoothing gradient value group that is generated by applying a second movement average process to the smoothing gradient value group shown in FIG. 12.

FIG. 13 is a diagram illustrating a smoothing gradient value group that is generated by applying the second movement average process to a smoothing gradient value group shown in FIG. 12. The horizontal axis indicates the gradient calculation pixels R1 to R16 and the vertical axis indicates the gradient values.

A new smoothing gradient value group is generated by applying the second movement average process to the smoothing gradient value group obtained after the quantization process is executed. In this case, with respect to the gradient calculation pixel to which the movement average process is to be applied, nine smoothing gradient values including four anterior smoothing gradient values and four posterior smoothing gradient values and a smoothing gradient value corresponding to the gradient calculation pixel are used to calculate an average of the nine smoothing gradient values. As described above, since the smoothing process is applied to the gradient value group of the gradient values corresponding to the sixteen gradient calculation pixels R1 to R16 when the sixteen gradient calculation pixels R1 to R16 are arranged in the order of circumferentially surrounding the evaluation pixel Q1, the four anterior smoothing gradient values and the four posterior smoothing gradient values of the smoothing gradient value of the gradient calculation pixel R1 are smoothing gradient values that correspond to the gradient calculation pixels R13 to R16 and the gradient calculation pixels R2 to R5. Similarly, the four anterior smoothing gradient values and the four posterior smoothing gradient values of the smoothing gradient value of the gradient calculation pixel R16 are smoothing gradient values that correspond to the gradient calculation pixels R12 to R15 and the gradient calculation pixels R1 to R4. As shown in FIG. 13, in regards to the smoothing gradient values that constitute the generated smoothing gradient value group, a smoothing gradient value that corresponds to the gradient calculation pixel R1 is "4.7", a smoothing gradient value that corresponds to the gradient calculation pixel R2 is "5.6", a smoothing gradient value that corresponds to the gradient calculation pixel R3 is "6.9", a smoothing gradient value that corresponds to the gradient calculation pixel R4 is "8.2", a smoothing gradient value that corresponds to the gradient calculation pixel R5 is "9.6", a smoothing gradient value that corresponds to the gradient calculation pixel R6 is "10.4", a smoothing gradient value that corresponds to the gradient calculation pixel R7 is "11.3", a smoothing gradient value that corresponds to the gradient calculation pixel R8 is "11.8", a smoothing gradient value that corresponds to the gradient calculation pixel R9 is "11.3", a smoothing gradient value that corresponds to the gradient calculation pixel R10 is "10.4", a smoothing gradient value that corresponds to the gradient calculation pixel R11 is "9.1", a smoothing gradient value that corresponds to the gradient calculation pixel R12 is "7.8", a smoothing gradient value that corresponds to the gradient calculation pixel R13 is "6.4", a smoothing gradient value that corresponds to the gradient calculation pixel R14 is "5.1", a smoothing gradient value that corresponds to the gradient calculation pixel R15 is "4.7", and a smoothing gradient value that corresponds to the gradient calculation pixel R16 is "4.7". In this way, if the second movement average process is executed, the smoothing gradient value "11.8" that corresponds to the gradient calculation pixel R8 is obtained as the smoothing gradient value that has the unique maximum value.

Figure 14:
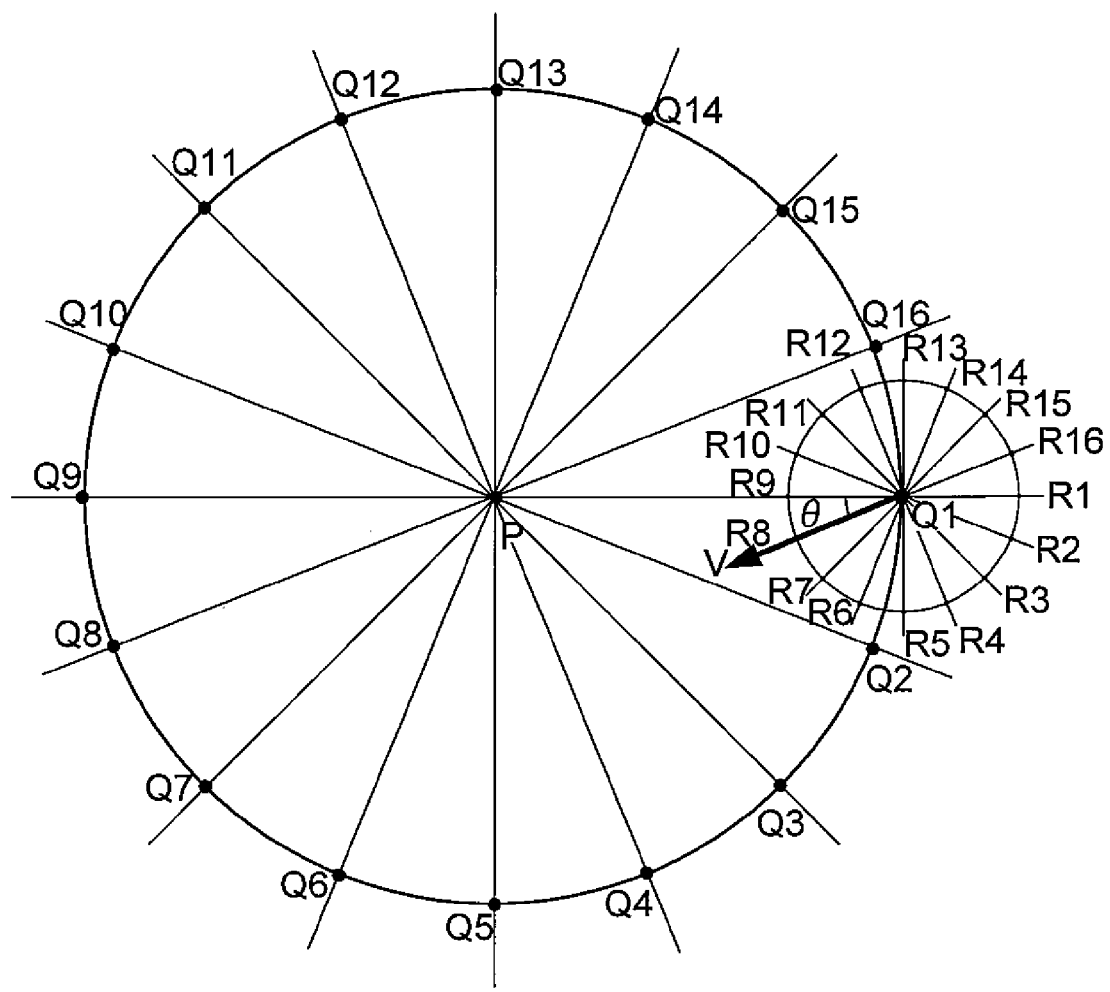
FIG. 14 is a diagram illustrating a gradient direction with respect to an evaluation pixel Q1.
Figure 15:
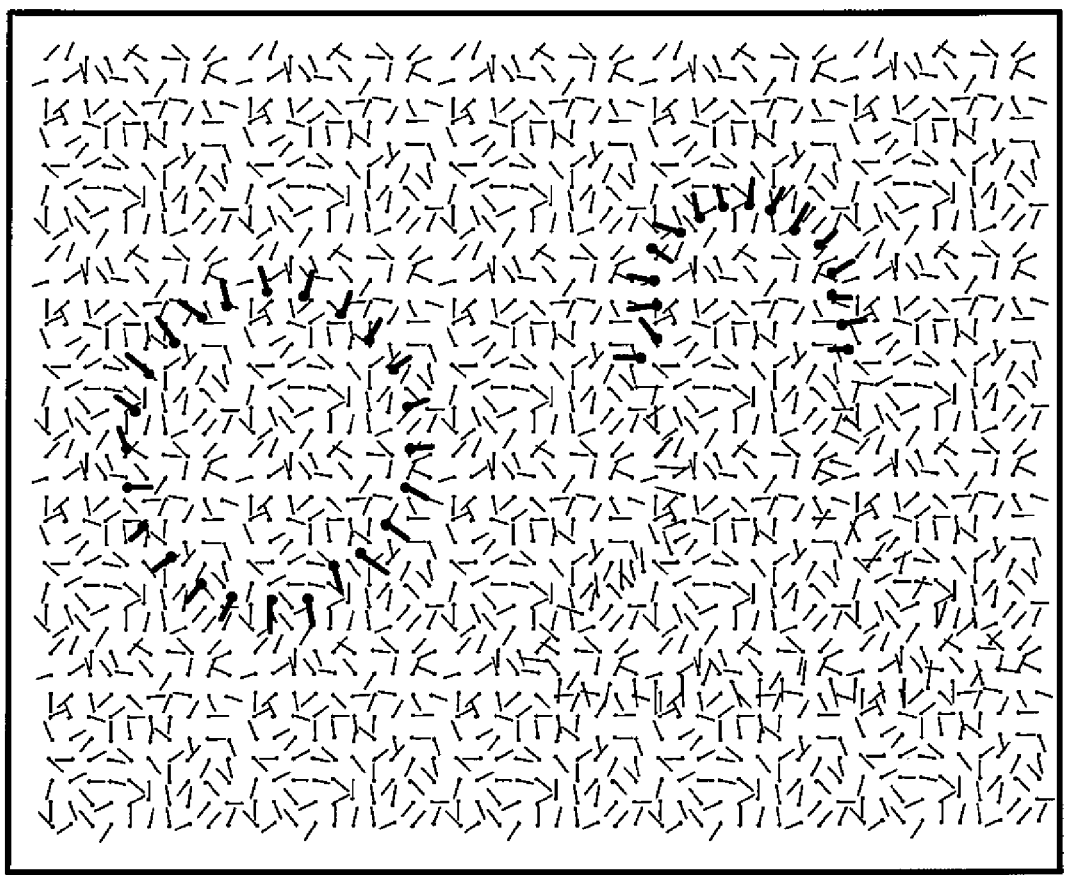
FIG. 15 is a diagram illustrating a gradient direction that is calculated for each of evaluation pixels over the entire area of an image shown in FIG. 7.

FIG. 14 is a diagram illustrating a gradient direction with respect to the evaluation pixel Q1. FIG. 15 is a diagram illustrating a gradient direction that is calculated for each of evaluation pixels arranged over an entire area of the image 60 shown in FIG. 7.

The evaluation pixel Q1 is linked to the gradient calculation pixel R8 that is one of the sixteen gradient calculation pixels R1 to R16 that circumferentially surround the evaluation pixel Q1 and corresponds to the maximum smoothing gradient value "11.8" included in the smoothing gradient value group obtained after the second movement average process is executed, so that a direction indicated with an arrow in FIG. 14 is determined as a gradient direction V with respect to the evaluation pixel Q1.

As described above, the gradient direction V with respect to one evaluation pixel Q1 among the sixteen evaluation pixels Q1 to Q16, which are arranged along the circle with the target pixel P shown in FIG. 8 as its center to surround the target pixel P, is calculated. With respect to the other evaluation pixels Q2 to Q16 shown in FIG. 8, their gradient directions are also calculated in a manner similar to the calculation of the gradient direction V with respect to the evaluation pixel Q1 described above with reference to FIGS. 8 to 14. Further, with respect to other types of evaluation pixels such as those arranged along a circle with the target pixel P as its center and having a radius different from that of the circle shown in FIG. 8 to surround the target pixel P and those surrounding a target pixel positioned at a location different from the position of the target pixel P shown in FIG. 8 and selected from plural pixels representing the image 60 shown in FIG. 7, their gradient directions are also calculated in a manner similar to the calculation of the gradient direction V with respect to the evaluation pixel Q1 described above with reference to FIGS. 8 to 14. FIG. 15 shows the gradient directions calculated in these ways with respect to the evaluation pixels arranged over the entire area of the image 60 shown in FIG. 7.

Next, with respect to each of the evaluation pixels that are arranged over the entire area of the image 60 shown in FIG. 7, a pixel evaluation value is calculated based on an angle formed by both a direction linking the evaluation pixel to a predetermined target pixel and the calculated gradient direction. As described above, the pixel evaluation values are used to evaluate whether each of the evaluation pixels arranged over the entire area of the image 60 shown in FIG. 7 is a pixel on a semicircle of 180° using the predetermined target pixel as its center. In this case, "angles in a range of 0 to 90 degrees" among the above-described angles are set as the pixel evaluation values. Accordingly, when the pixel evaluation value is a value that approximates to "0", it is assumed that the gradient direction of the evaluation pixel having the pixel evaluation value is a direction that is oriented to the predetermined target pixel.

FIG. 16 is a diagram illustrating a table 70 as an example.

When the pixel evaluation values are calculated, the table 70 is stored. In the table 70 common to the plural target pixels and the plural evaluation pixels, a first value, a second value, and a pixel evaluation value of the evaluation pixel are associated with one other. The first value indicates a direction of the evaluation pixel when viewed from the target pixel common to the plural target pixels and the plural evaluation pixels, and the second value that indicates a gradient direction of the evaluation pixel. In this case, the table 70 needs to be stored before calculating a specific pixel evaluation value of the evaluation pixel which will described below, but may be stored either before or after calculating the gradient direction.

In the table 70 shown in FIG. 16, the sixteen directions from the target pixel P to the evaluation pixels Q1 to Q16 in FIG. 8 are represented as "PQ1, PQ2, PQ3, PQ4, PQ5, PQ6, PQ7, PQ8, PQ9, PQ10, PQ11, PQ12, PQ13, PQ14, PQ15, and PQ16", serving as the first values that indicate the directions of the evaluation pixels when viewed from the target pixel. Further, the sixteen directions from the evaluation pixel Q1 to the gradient calculation pixels R1 to R16 in FIG. 8 are represented as "QR1, QR2, QR3, QR4, QR5, QR6, QR7, QR8, QR9, QR10, QR11, QR12, QR13, QR14, QR15, and QR16", serving as the second values that indicate the gradient directions of the evaluation pixels. In the table 70 shown in FIG. 16, both the first values and the second values are associated with the "angles in a range of 0 to 90 degrees" that are the pixel evaluation values of the evaluation pixels. Furthermore, in the table 70 shown in FIG. 16, partial pixel evaluation values among the pixel evaluation values are shown, and the actually stored table 70 has all of the pixel evaluation values that are associated with both the first values and the second values.

On the basis of specific first values that indicate the directions of specific evaluation pixels when the specific evaluation pixels are viewed from the specific target pixel, and specific second values that indicate the gradient directions of the specific evaluation pixels, the pixel evaluation values of these evaluation pixels are calculated using the table 70 shown in FIG. 16.

For example, in the case of the gradient direction V with respect to the evaluation pixel Q1 that has been described with reference to FIGS. 8 to 14, as shown in FIG. 14, the first value is "PQ1", and the second value is "QR8". On the basis of the specific first value and the specific second value, the pixel evaluation value of the evaluation pixel Q1 is calculated as "22.5", based on the table 70 shown in FIG. 16.

With respect to the other evaluation pixels Q2 to Q16 that are shown in FIG. 8, the pixel evaluation values are also calculated based on the table 70 shown in FIG. 16.

Next, a process of integrating plural pixel evaluation values corresponding to the evaluation pixels Q1 to Q9 that are the plural evaluation pixels on a semicircle of 180° overlapping a circle shown in FIG. 8 and calculating an integrated evaluation value to evaluate whether the semicircle of 180° is a semicircle of 180° corresponding to an approximately semicircular shape, is applied to each of the plural semicircles of 180° that overlap the circle and have phases different from each other. In this case, an average value of the plural pixel evaluation values is used as the integrated evaluation value. Also, with respect to evaluation pixels such as evaluation pixels arranged along a circle with the target pixel P as its center to surround the target pixel P and having a radius different from the radius of the circle shown in FIG. 8, and evaluation pixels that surround a target pixel positioned at a location different from the position of the target pixel P shown in FIG. 8 and selected from plural pixels representing the image 60 shown in FIG. 7, an integrated evaluation value is calculated.

Next, the plural integrated evaluation values that correspond to the plural semicircles of 180° are compared with each other, and a semicircle of 180° with which an integrated evaluation value indicating the most approximation to the approximately semicircular shape is associated is extracted from the plural semicircles of 180°. The extracted semicircle of 180° is associated with an evaluation value that indicates a degree of the possibility that the head portion shape, which is similar to the head portion of a person with the outline of an upper part being in the shape of an approximately semicircular shape, can be the head portion of the extraction target. As described above, among angles that are made by the directions linking the evaluation pixels to the predetermined target pixel and the calculated gradient directions, the "angles in a range of 0 to 90" are set as the pixel evaluation values. Accordingly, when the integrated evaluation value that is an average value of the plural pixel evaluation values approximates to "0", it is assumed that the semicircle of 180° with which the integrated evaluation value is associated is most similar to the approximately semicircular shape. In addition, when the semicircle of 180° is extracted, a threshold value that allows leakage from the extraction is set, and the threshold value is, for example, "30". In this case, the semicircle of 180° with which the integrated evaluation value in a range of "0 to 30" is associated, is extracted. In other words, only the similar head portion shape where an evaluation value indicating that the possibility of being the head portion of the extraction target is higher than the threshold value "30" is obtained, is extracted. The semicircle of 180° obtained in the above way is the similar head portion shape extracted by the extracting section 520.

In this case, the purpose of the extracting section 520 is not to precisely extract the head portion of the extraction target but to extract only the head portion that is determined as the head portion of the extraction target. Because such a threshold value is set, those with the possibility of being the head portion of the extraction target is low are excluded. Accordingly, it is possible to construct the appearance probability distribution with higher precision.

When extracting the similar head portion shape, the extracting section 520 also extracts a diameter size of the semicircle of 180° that is a size of the similar head portion shape, together with the central coordinates of the semicircle of 180° indicating positional information on the view angle of the monitoring camera 10.

Among the gradient directions that are shown in FIG. 15, gradient directions that are shown by thick lines indicate gradient directions with respect to the plural evaluation pixels on the extracted semicircle of 180°.

The extracting section 520 has been described with reference to FIGS. 8 to 16, by taking the image 60 shown in FIG. 7 among the plural images acquired by the image acquiring section 510 as an example. However, the extracting section 520 extracts the similar head portion shape that repeatedly appears in various sizes in the plural images, together with the size of the similar head portion shape and the positional information on the view angle of the monitoring camera 10, from the plural images acquired by the image acquiring section 510.

The method of extracting the similar head portion shape using the extracting section 520 is not limited to the method that has been described with reference to FIGS. 8 to 16. Any method may be employed as long as the method allows the extracting section 520 to extract, from the plural images that are acquired by the image acquiring section 510, the similar head portion shape repeatedly appearing in various sizes in the plural images, together with the size of the similar head portion shape and the positional information on the view angle of the monitoring camera 10.

The case where the size of the similar head portion shape is the diameter size of the semicircle of 180° has been exemplified, but the size of the similar head portion shape may be, for example, a vertical width, a horizontal width, an area or the like.

Figure 17:
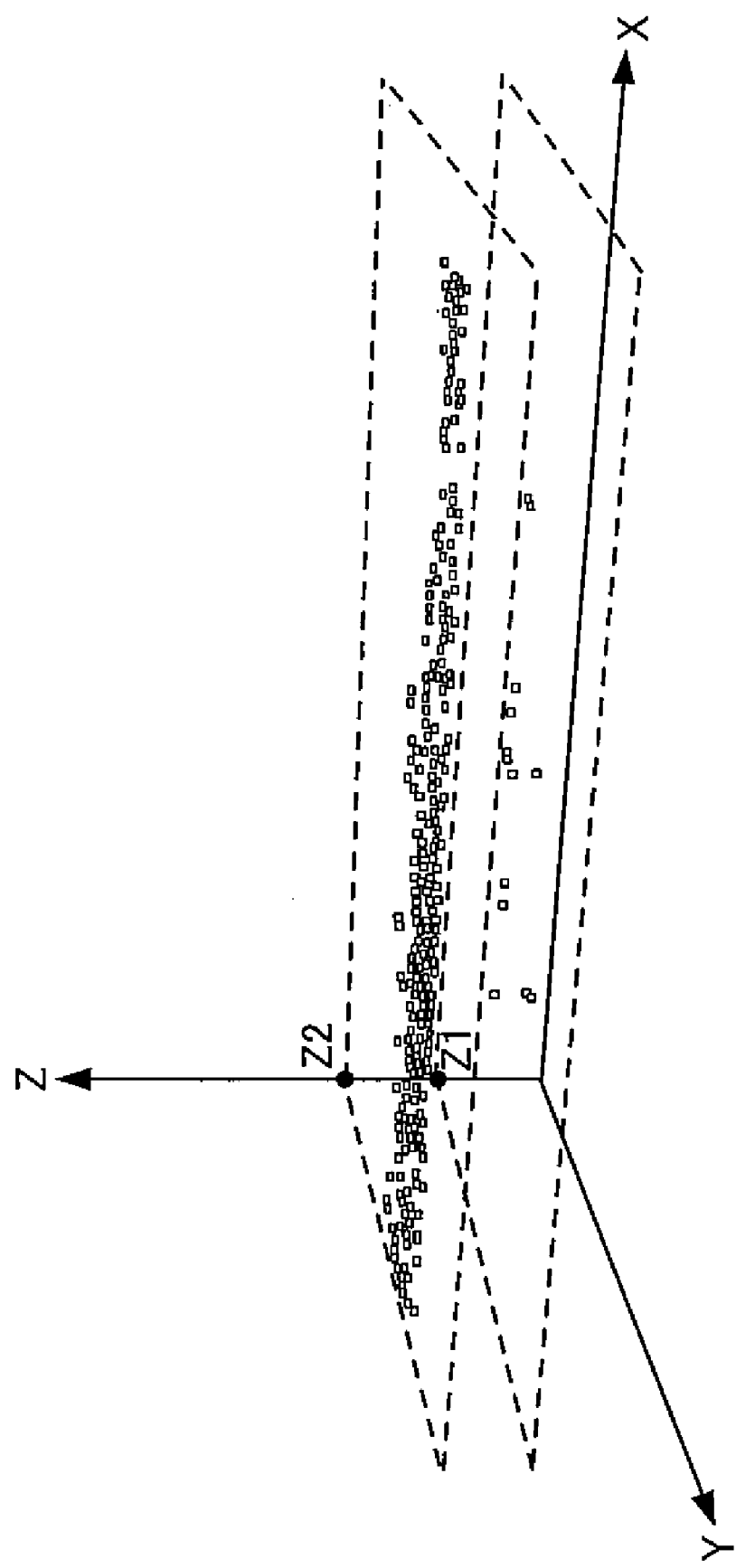
FIG. 17 is a diagram illustrating a three-dimensional space of a head portion size.

FIG. 17 shows a three-dimensional space of a head portion size. In this case, the X axis indicates a horizontal direction of the photographing view angle, the Y axis indicates a vertical direction of the photographing view angle, and the Z axis indicates a head portion size. In this case, the higher on the Z axis, the relatively smaller the head size is.

Figure 18:
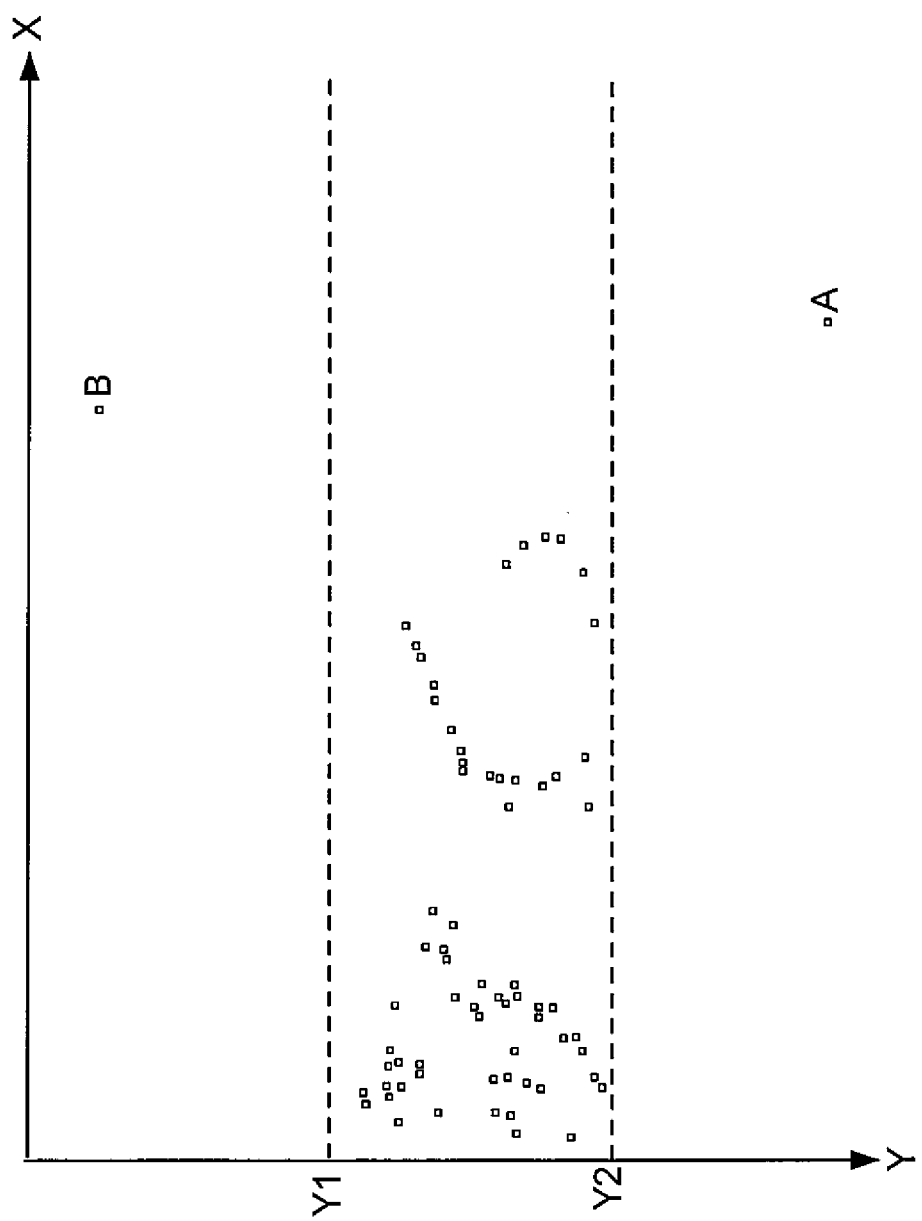
FIG. 18 is a diagram illustrating the case where a Z axis coordinate value shown in FIG. 17 indicates a distribution of a similar head portion shape on an XY plane of "Z1"
Figure 19:
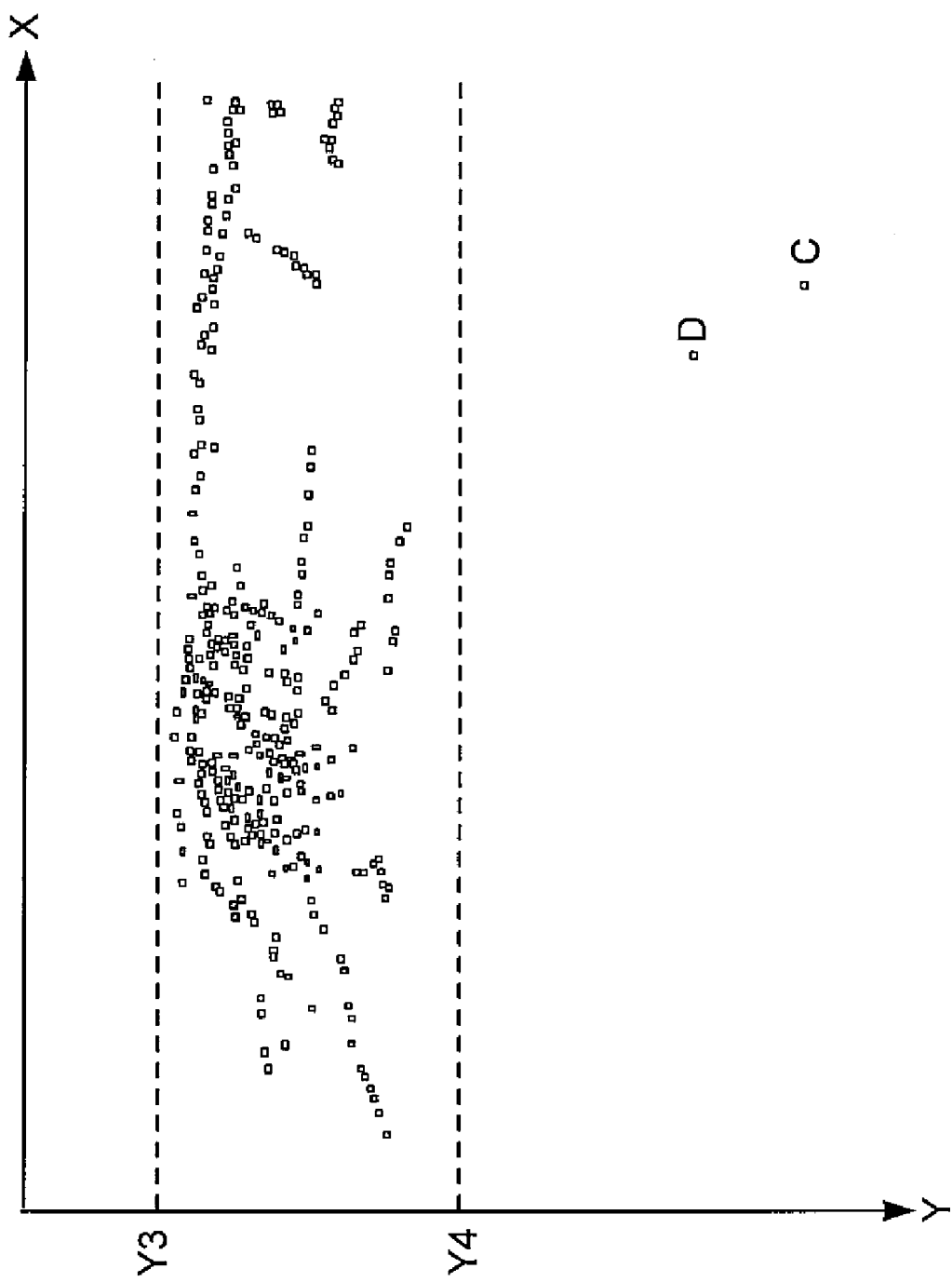
FIG. 19 is a diagram illustrating the case where a Z axis coordinate value shown in FIG. 17 indicates a distribution of a similar head portion shape on an XY plane of "Z1"

FIG. 18 is a diagram illustrating a distribution of a similar head portion shape on an XY plane where a Z axis coordinate value shown in FIG. 17 is "Z1", and FIG. 19 is a diagram illustrating a distribution of a similar head portion shape on an XY plane where a Z axis coordinate value shown in FIG. 17 is "Z2". The "Z1" is a Z axis coordinate value being at the lower side and representing a relatively large head portion size, and the "Z2" is a Z axis coordinate value being at an upper side and representing a relatively small head portion size. The horizontal axis in FIGS. 18 and 19 is an X axis that indicates a horizontal direction of the photographing view angle, and the vertical axis is a Y axis that indicates a vertical direction of the photographing view angle.

Each of the points shown in FIGS. 17 to 19 indicates a similar head portion shape that is extracted by the extracting section 520. In addition, the location of each of the points on the XY plane when projected onto the XY plane is represented by central coordinates of a semicircle of 180° extracted by the extracting section 520 and serving as positional information on the view angle of the monitoring camera 10. Further, a Z axis coordinate value of each point projected onto the Z axis is the diameter size of a semicircle of 180° extracted by the extracting section 520, which is the size of the similar head portion shape.

As shown in FIG. 18, when the Z axis coordinate value shown in FIG. 17, that is, the size of the similar head portion shape is "Z1", multiple similar head portion shapes are distributed at the locations where a Y axis value on the XY plane, in which the Z axis coordinate value is "Z1", is in a range of "Y1 to Y2". Also, at the locations where the Y axis value on the XY plane is out of the range of "Y1 to Y2", two similar head portion shapes "A and B" are distributed.

Further, as shown in FIG. 19, when the Z axis coordinate value shown in FIG. 17, that is, the size of the similar head portion shape is "Z2", multiple similar head portion shapes are distributed at the locations where a Y axis value on the XY plane, in which the Z axis coordinate value is "Z2", is in a range of "Y3 to Y4". Also, at the locations where the Y axis value on the XY plane is out of the range of "Y3 to Y4", two similar head portion shapes "C and D" are distributed.

In this case, for each of the similar head portion shapes that are extracted by the extracting section 520, the filtering section 530 counts the number of other similar head portion shapes classified as having the same size as the similar head portion shape in a search area having a predetermined size expanding around the similar head portion shape in a view angle. Only when the count value is the threshold value "3" or more, the filtering section 530 determines that the similar head portion shape is the head portion of the person and extracts the similar head portion shape as the head portion of the person.

For example, the two similar head portion shapes "A and B" shown in FIG. 18 are excluded by the filtering section 530, and the similar head portion shape where the Y axis value is distributed in the range of "Y1 to Y2" is extracted as the head portion of the person having the size "Z1". In addition, for example, the two similar head portion shapes "C and D" shown in FIG. 19 are excluded by the filtering section 530, and the similar head portion shape where the Y axis value is distributed in the range of "Y3 to Y4" is extracted as the head portion of the person having the size "Z2".

Because such a threshold value is set, the similar head portion shapes that are highly likely to be erroneously detected can be excluded among the similar head portion shapes extracted by the extracting section 520. Accordingly, it is possible to construct an appearance probability distribution with higher precision.

Figure 20:
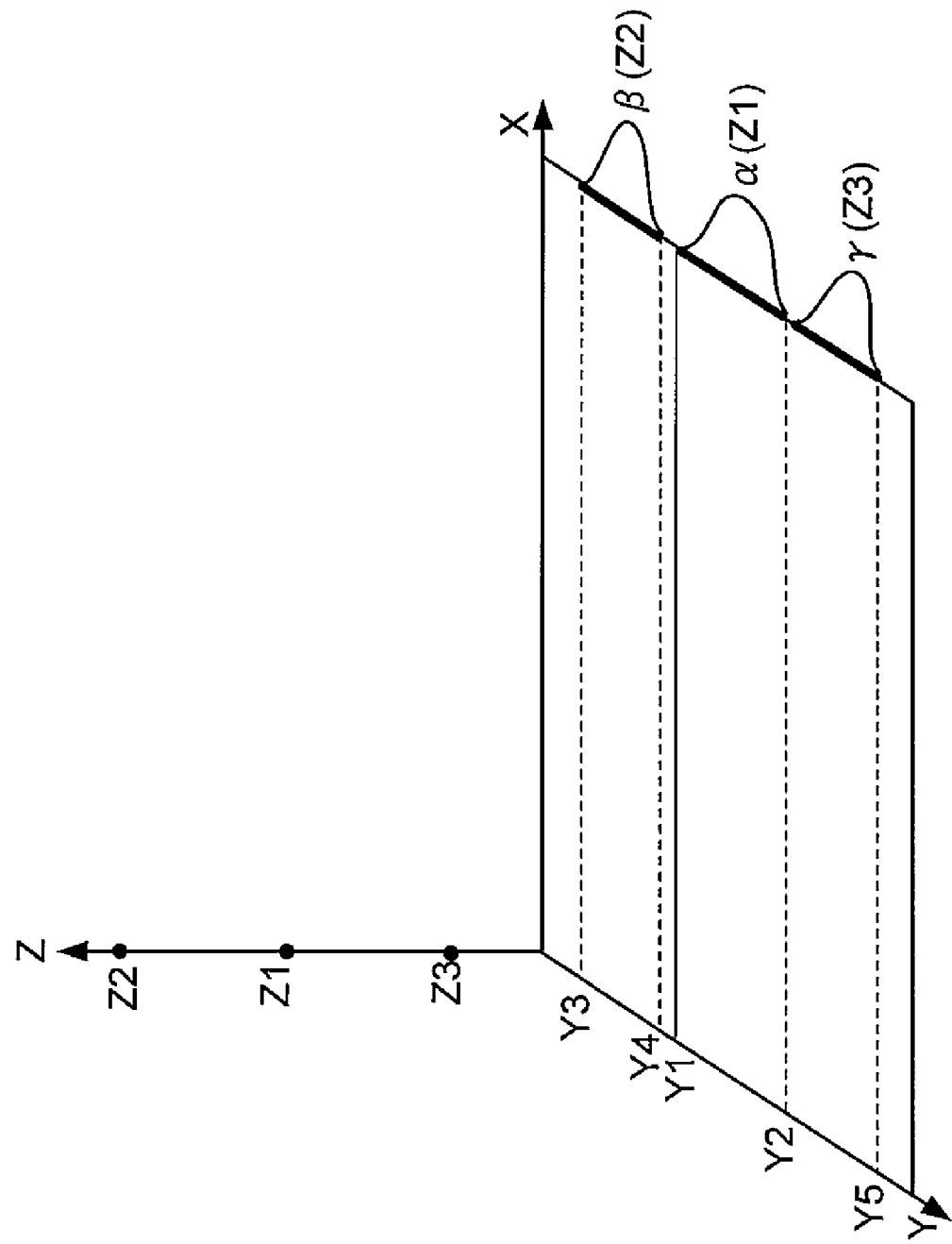
FIG. 20 is a diagram illustrating an example of an appearance probability distribution that is calculated by a probability distribution calculating section and output by an output section.

FIG. 20 is a diagram illustrating an example of an appearance probability distribution that is calculated by the probability distribution calculating section 540 and output by the output section 560.

The probability distribution calculating section 540 calculates an appearance probability distribution of the size of the head portion extracted by the filtering section 530. In this case, the probability distribution calculating section 540 calculates an appearance location probability distribution in which the head portion in one size of the person appears at each location in a view angle with respect to one size, for each of the plural sizes of the head portion of the person. For example, FIG. 20 shows an appearance probability distribution α of the size "Z1" of the head portion extracted by the filtering section 530 where the Y axis value is distributed in a range of "Y1 to Y2", and an appearance probability distribution β of the size "Z2" of the head portion extracted by the filtering section 530 where the Y axis value is distributed in a range of "Y3 to Y4".

Further, the interpolation operating section 541 of the probability distribution calculating section 540 calculates an appearance location probability distribution of the head portion having a predetermined size by applying an interpolation operating process to the appearance location probability distribution of the head portion in a size different from the predetermined size. In FIG. 20, an appearance probability distribution γ of the size "Z3" of the head portion where the Y axis value is distributed in a range of "Y2 to Y5" is an appearance probability distribution calculated by the interpolation operating section 541.

Incidentally, the probability variables of the appearance probability distributions α, β, and γ shown in FIG. 20, which are calculated by the probability distribution calculating section 540 and output by the output section 560, are Y axis values.

Even when the number of head portions having specific sizes among the plural head portions extracted by the filtering section 530 is small, the interpolation operating section 541 can calculate an appearance probability distribution over the entire range of a view angle of the monitoring camera 10.

In addition, the output section 560 outputs the appearance probability distribution calculated by the probability distribution calculating section 540. The three appearance probability distributions α, β, and γ shown in FIG. 20 are examples of the appearance probability distributions output by the output section 560.

By referring to the output appearance probability distributions, for example, the output section 560 confirms the number of similar head portion shapes extracted by the extracting section and takes a complementary countermeasure when the number of similar head portion shapes is small, thereby contributing to construction of the appearance probability distribution with higher precision.

Figure 21:
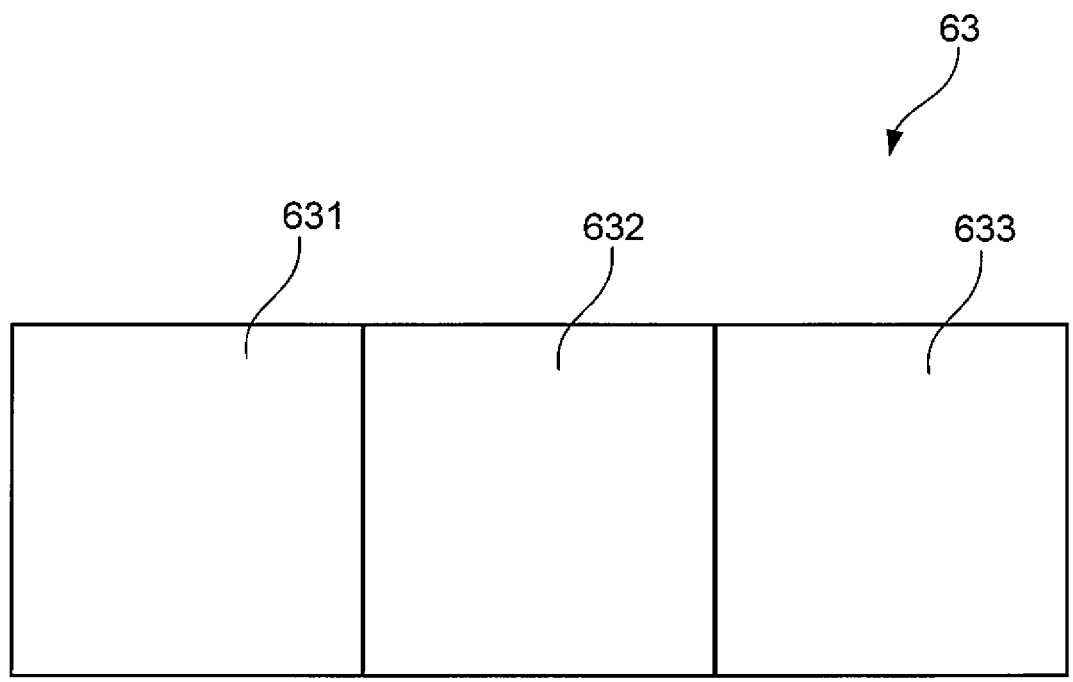
FIG. 21 is a diagram illustrating photographing by a monitoring camera in each of plural photographing directions.

FIG. 21 is a diagram illustrating photographing by the monitoring camera 10 in each of plural photographing directions.

As described above, the monitoring camera 10 has a swing function and can change a photographing direction. As shown in FIG. 21, the monitoring camera 10 has three photographing view angles 631, 632, and 633 that correspond to each of the photographing directions. The first integrating section 551 integrates appearance probability distributions that are obtained by photographing in each of three photographing directions corresponding to each of the three photographing view angles 631, 632, and 633, thereby constructing an appearance probability distribution in a view angle 63 that is obtained by linking the photographing view angles 631, 632, and 633 of the three photographing directions.

Figure 22:
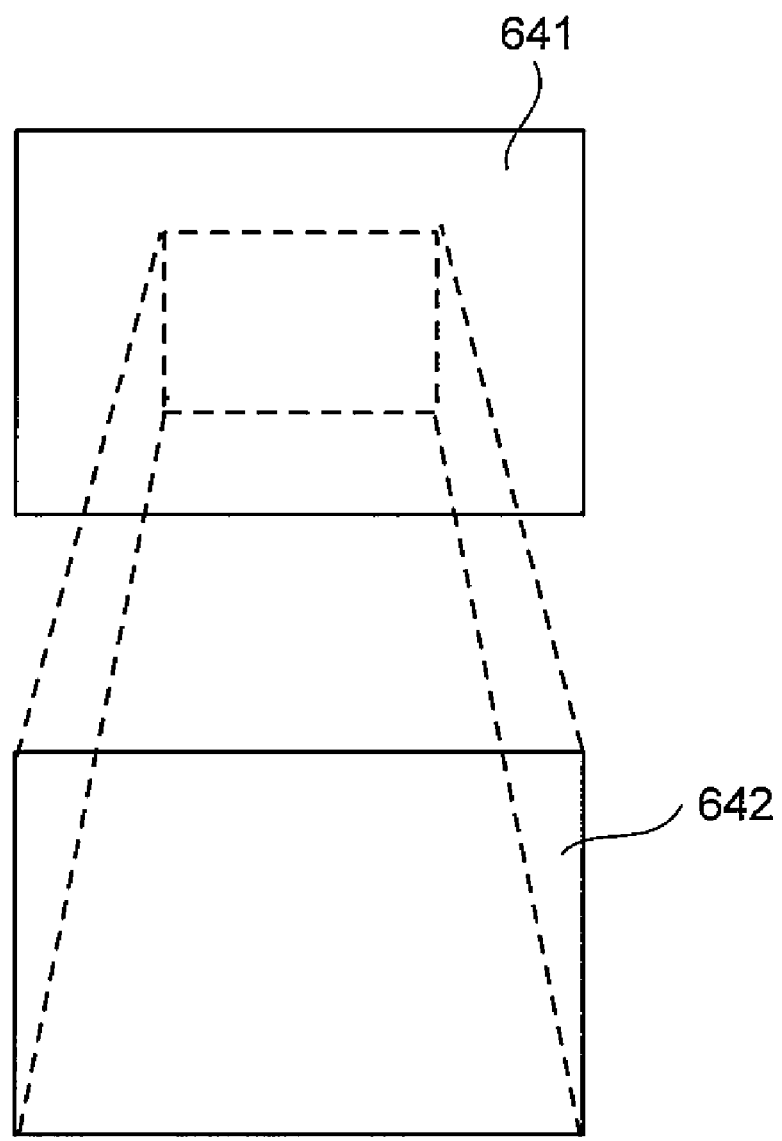
FIG. 22 is a diagram illustrating photographing by a monitoring camera at each of plural focal distances.

FIG. 22 is a diagram illustrating photographing at each of plural focal distances by the monitoring camera 10.

As described above, the monitoring camera 10 has a zoom function and can vary the focal distance. As shown in FIG. 22, the monitoring camera 10 has two photographing view angles 641 and 642 that correspond to the focal distances. The second integrating section 552 integrates appearance probability distributions that are obtained by photographing based on the two focal distances corresponding to the two photographing view angles 641 and 642, thereby constructing an appearance probability distribution in the photographing view angle 641 that is a view angle of a widest angle of the monitoring camera 10.

Even after the appearance probability distribution is constructed, the update control section 570 causes the image acquiring section 510 to acquire an image, causes the extracting section 520 and the filtering section 530 to apply the respective processes to the newly acquired image, and causes the probability distribution calculating section 540 to update the appearance probability distribution by newly adding information about the head portion of a person extracted from the new image to the appearance probability distribution.

The update control section 570 can improve precision of an appearance probability distribution.

Figure 23:
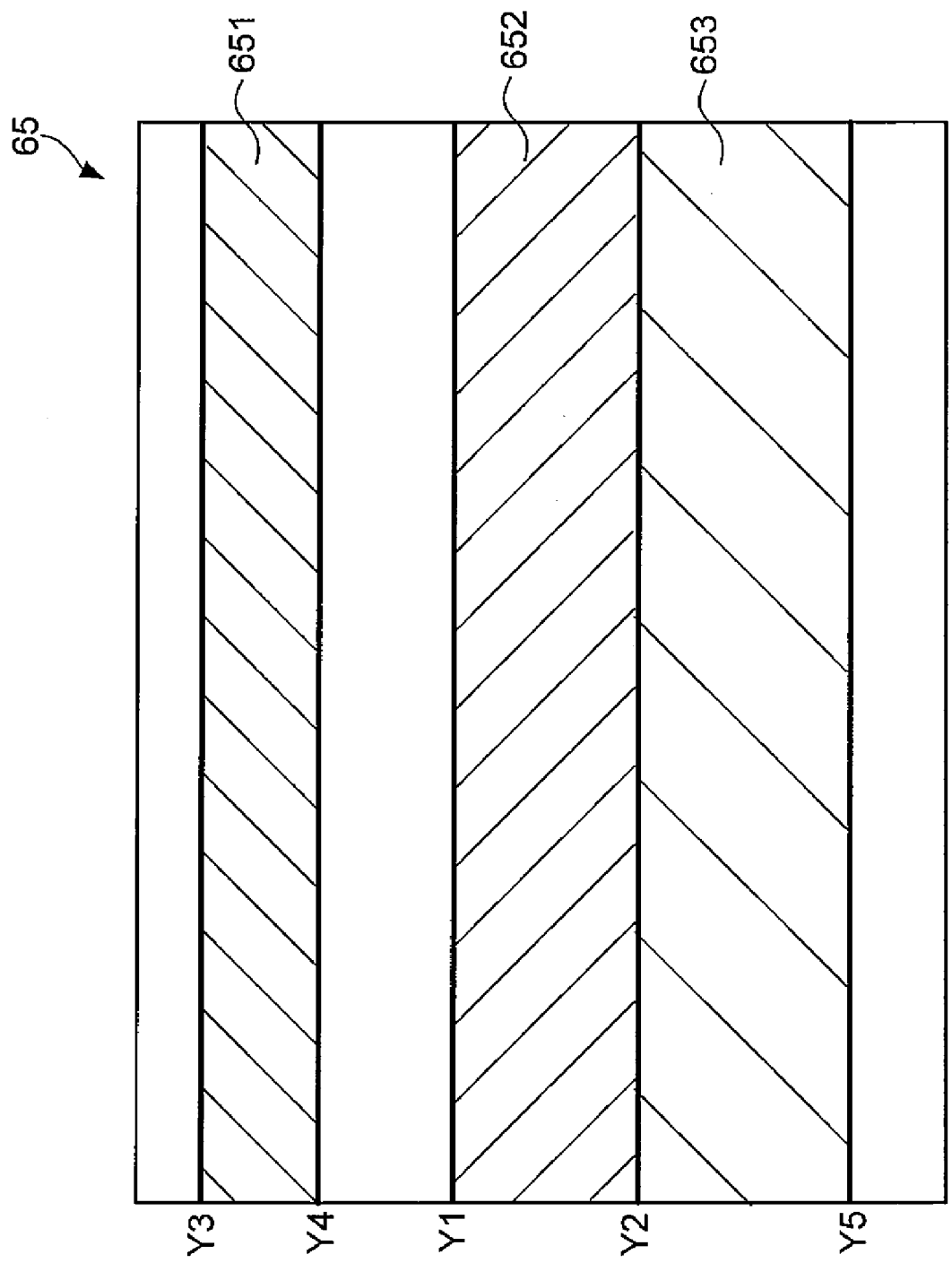
FIG. 23 is a diagram illustrating an example of a photographing view angle of a monitoring camera and an appearance area of a photographing view angle defined by an appearance area defining section.

FIG. 23 is a diagram illustrating an example of a photographing view angle of the monitoring camera 10 and an appearance area of a photographing view angle defined by the appearance area defining section 580. The horizontal direction of the photographing view angle shown in FIG. 23 corresponds to the X axis shown in FIGS. 17 to 20, and a vertical direction of the photographing view angle corresponds to the Y axis shown in FIGS. 17 to 20.

The appearance area defining section 580 defines an appearance area for each size of the head portion of a person appearing in the view angle 65 of the monitoring camera 10, on the basis of the appearance probability distribution calculated by the probability distribution calculating section 540. FIG. 23 shows three appearance areas 651, 652, and 653 as examples of the appearance area. In these three appearance areas 651, 652, and 653, the Y axis value shown in FIG. 20 corresponds to the range of "Y1 to Y2", the Y axis value corresponds to the range of "Y3 to Y4", and the Y axis value corresponds to the range of "Y2 to Y5", respectively. That is, the appearance area of the size "Z1" of the head portion of the person appearing in the view angle 65 of the monitoring camera 10 is the appearance area 652, the appearance area of the size "Z2" of the head portion of the person appearing in the view angle 65 is the appearance area 651, and the appearance area of the size "Z3" of the head portion of the person appearing in the view angle 65 is the appearance area 653.

Figure 24:
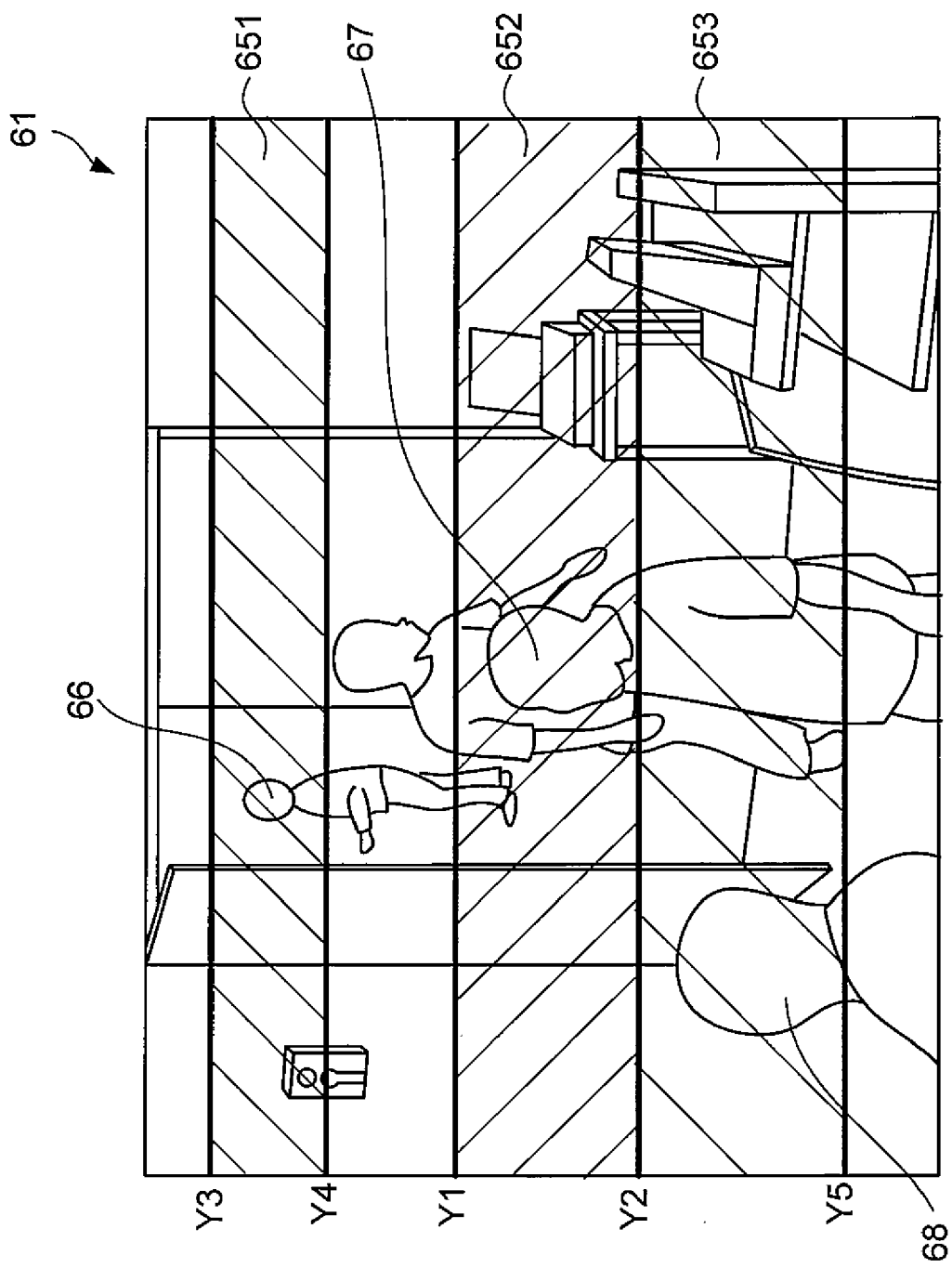
FIG. 24 is a diagram illustrating an example of an image that is acquired by an image acquiring section.

FIG. 24 is a diagram illustrating an example of an image acquired by the image acquiring section 510. The horizontal direction of the image shown in FIG. 24 corresponds to the X axis shown in FIGS. 17 to 20, and the vertical direction of the image corresponds to the Y axis shown in FIGS. 17 to 20.

Similar to the image shown in FIG. 7, an image 61 shown in FIG. 24 is one of plural images that are acquired by the image acquiring section 510 as a result of photographing a field repeatedly using the monitoring camera 10. FIG. 24 shows a state where the three appearance areas 651, 652, and 653 shown in FIG. 23 overlap the image 61.

The subject detecting section 590 detects the head portion of a person appearing, as the similar head portion shape having the size, within the appearance area according to the size in the image obtained by new photographing by the monitoring camera 10.

In this case, a head portion 67 of the person appearing as the similar head portion shape having the size "Z1" is detected in the appearance area 652 according to the size "Z1" in the image 61. In addition, a head portion 66 of the person appearing as the similar head portion shape having the size "Z2" is detected in the appearance area 651 according to the size "Z2" in the image 61. In addition, a head portion 68 of the person appearing as the similar head portion shape having the size "Z3" is detected in the appearance area 653 according to the size "Z3" in the image 61.

According to the first embodiment, it is possible to construct an appearance probability distribution of the size of a head portion of a person repeatedly appearing in various sizes in the plural images, which is effective at detecting the head portion of the person with high precision from plural images obtained by repeatedly photographing the field using the fixedly disposed monitoring camera 10. If the head portion of the person is detected using the constructed appearance probability distribution, detection at a higher speed can be realized, and erroneous detection can be suppressed.

This concludes the description of the first embodiment of the present invention and the second embodiment of the present invention will be described.

In the second embodiment that will be described, the probability distribution calculating step (step S14), the probability distribution calculation section 440, the interpolation operating section 441, the probability distribution calculating section 540, and the interpolation operating section 541 according to the first embodiment are replaced by a second probability distribution calculating step (step S24), a second probability distribution calculating section 840, a second interpolation operating section 841, a second probability distribution calculating section 940, and a second interpolation operating section 941, respectively.

Further, in the second embodiment that will be described, the appearance area defining step (step S17), the appearance area defining section 480, and the appearance area defining section 580 according to the first embodiment are replaced by a second extracting step (step S27), a second extracting section 880, and a second extracting section 980, respectively.

Furthermore, in the second embodiment that will be described, the subject detecting step (step S18), the subject detecting section 490, and the subject detecting section 590 according to the first embodiment are replaced by a second determining step (step S28), a second determining section 890, and a second determining section 990, respectively.

Hereinafter, the same elements in the second embodiments as those of the first embodiment are denoted by the same symbols and will not be described. Only a difference between the second embodiment and the first embodiment will be described.

Figure 25:
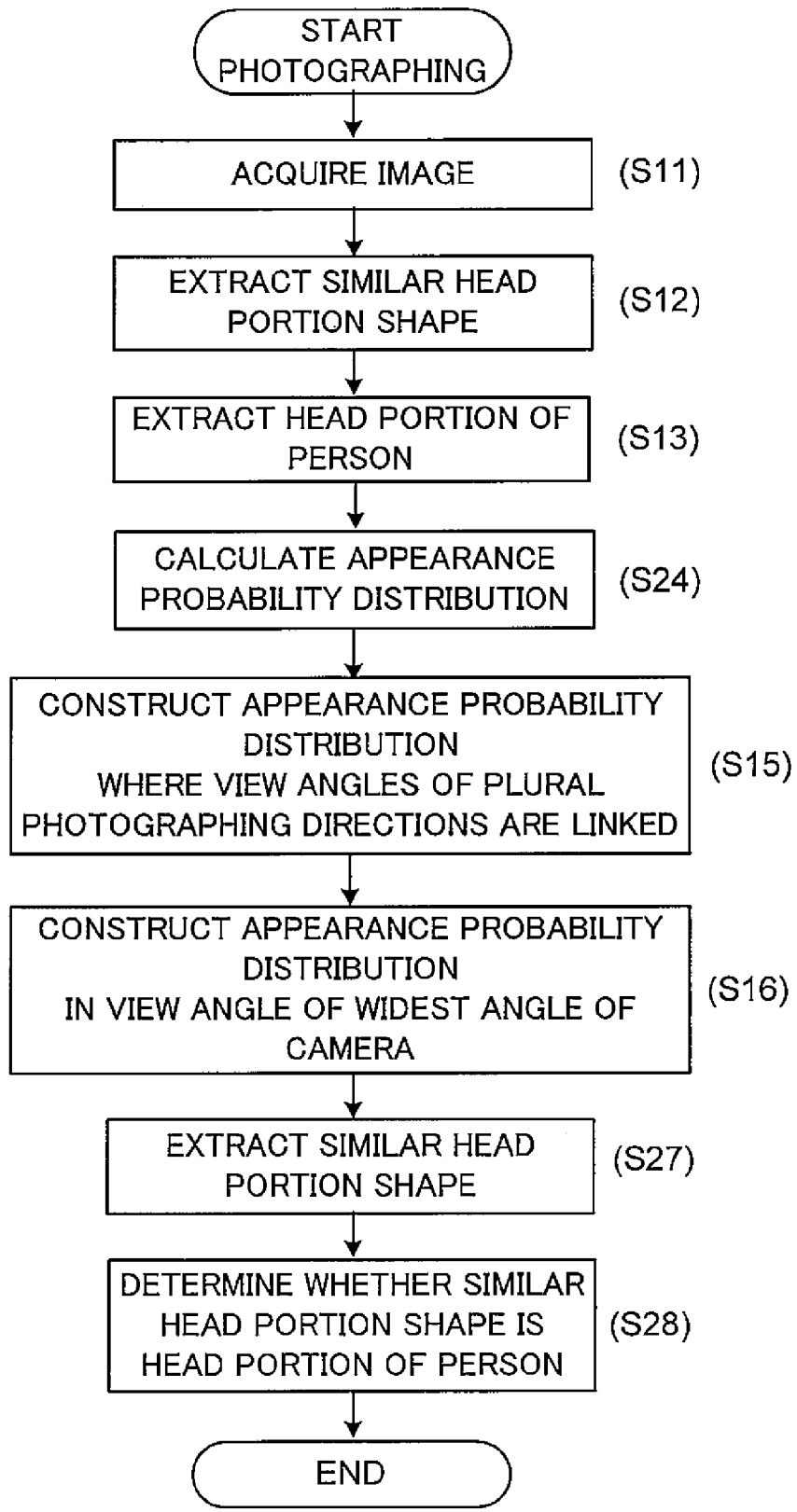
FIG. 25 is a flowchart illustrating a subject detecting method according to a second embodiment of the present invention.

FIG. 25 is a flowchart illustrating a subject detecting method according to the second embodiment of the present invention.

The subject detecting method includes the image acquiring step (step S11), the extracting step (step S12), the filtering step (step S13), the second probability distribution calculating step (step S24), the first integrating step (step S15), the second integrating step (step S16), the second extracting step (step S27), and the second determining step (step S28).

Among these steps, the steps of the image acquiring step (step S18), the extracting step (step S12), the filtering step (step S13), the second probability distribution calculating step (step S24), the first integrating step (step S15), and the second integrating step (step S16) are elements included in the probability distribution constructing method according to the second embodiment of the present invention. The second extracting step (step S27) and the second determining step (step S28) are not included.

The steps included the subject detecting method shown in FIG. 25 will be described in detail below.

Figure 26:
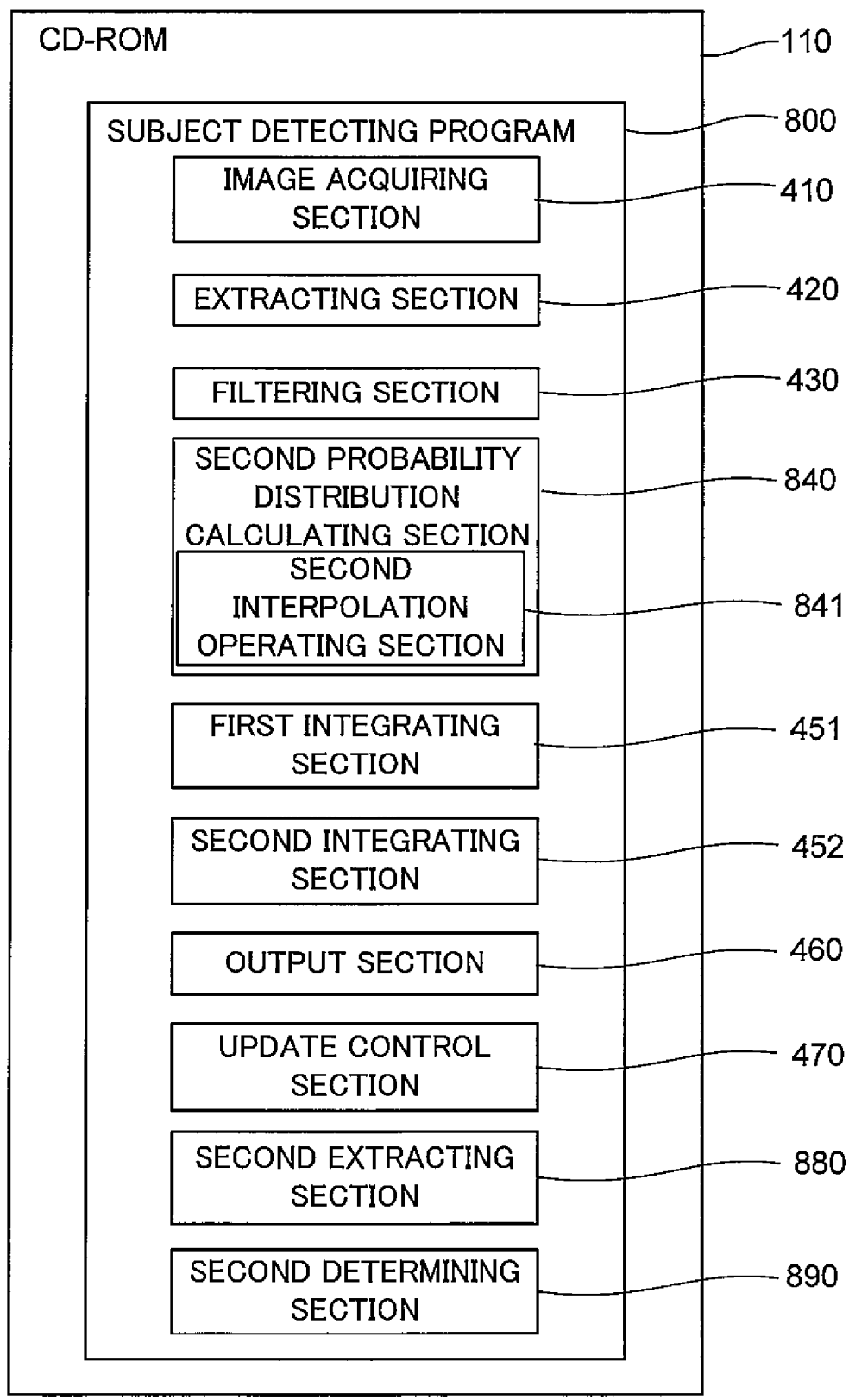
FIG. 26 is a diagram illustrating a storage medium that stores a subject detecting program according to the second embodiment of the present invention.

FIG. 26 is a diagram illustrating a subject detecting program 800 according to the second embodiment of the present invention.

The subject detecting program 800 shown in FIG. 26 is stored in the CD-ROM 110 shown in FIG. 3.

The subject detecting program 800 is executed in the personal computer 30 shown in FIGS. 1, 2 and 3 and allows the personal computer 30 to operate as the subject detecting apparatus according to the second embodiment of the present invention. The subject detecting program 800 includes the image acquiring section 410, the extracting section 420, the filtering section 430, the second probability distribution calculating section 840, the first integrating section 451, the second integrating section 452, the output section 460, the update control section 470, the second extracting section 880, and the second determining section 890. In addition, the second probability distribution calculating section 840 has the second interpolation operating section 841.

Among the program components that are constructed by the subject detecting program 800, except for the second extracting section 880 and the second determining section 890, the program components of the image acquiring section 410, the extracting section 420, the filtering section 430, the second probability distribution calculating section 840, the second interpolation operating section 841, the first integrating section 451, the second integrating section 452, the output section 460, and the update control section 470 are included in the probability distribution constructing program according to the second embodiment of the present invention.

Among the program components that are constructed by the subject detecting program 800, except for the output section 460 and the update control section 470, the program components of the image acquiring section 410, the extracting section 420, the filtering section 430, the second probability distribution calculating section 840, the first integrating section 451, the second integrating section 452, the second extracting section 880, and the second determining section 890 are the elements that implement the image acquiring step (step S11), the extracting step (step S12), the filtering step (step S13), the second probability distribution calculating step (step S24), the first integrating step (step S15), the second integrating step (step S16), the second extracting step (step S27), and the second determining step (step S28) of the subject detecting method shown in FIG. 25, respectively, when the subject detecting program 800 is installed and executed in the personal computer 30 shown in FIGS. 1, 2 and 3.

The functions of the elements of the subject detecting program 800 will be described later.

Figure 27:
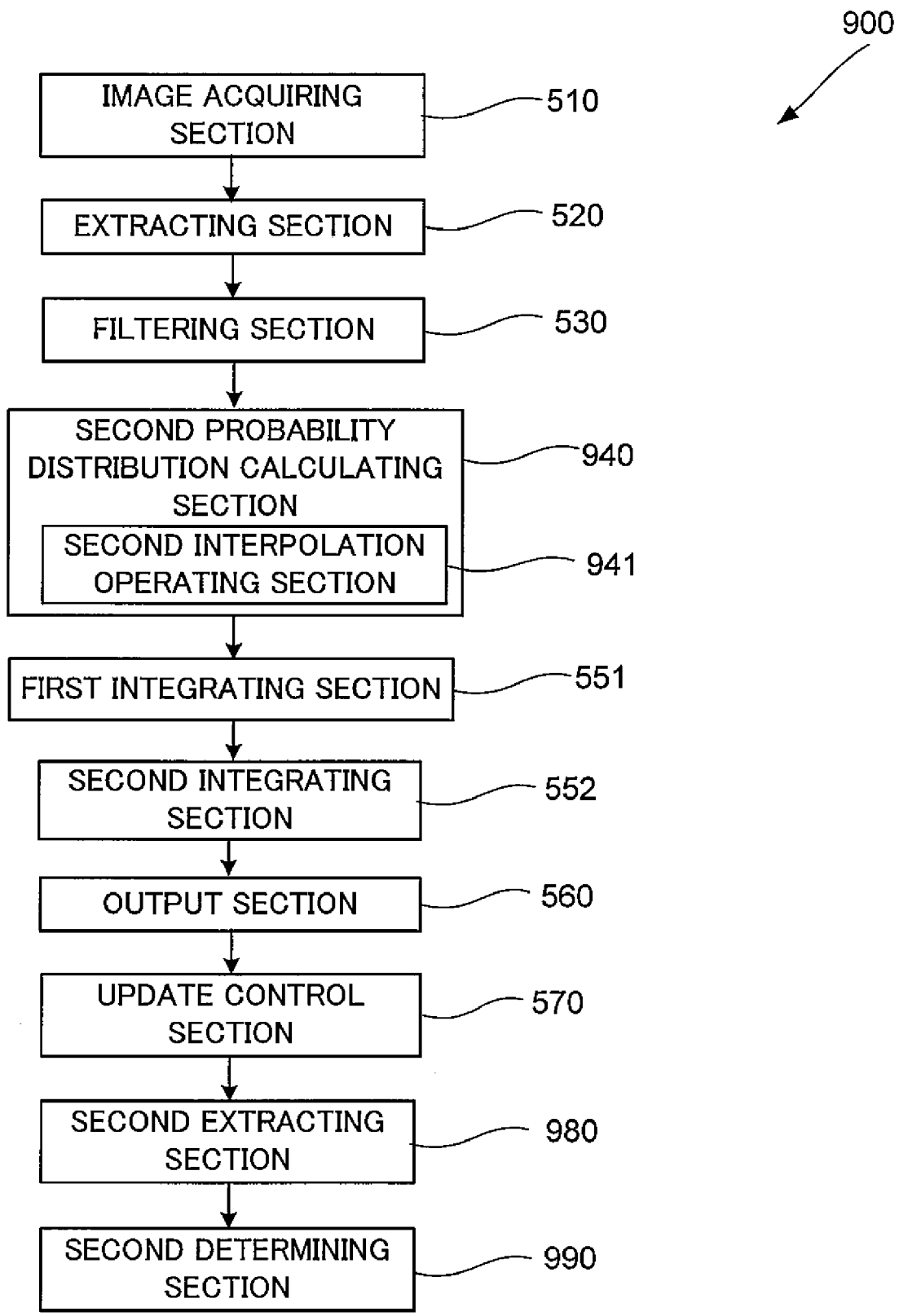
FIG. 27 is a functional block diagram illustrating a subject detecting apparatus according to the second embodiment of the present invention.

FIG. 27 is a functional block diagram illustrating a subject detecting apparatus 900 according to the second embodiment of the present invention.

The subject detecting apparatus 900 shown in FIG. 27 is realized when the subject detecting program 800 shown in FIG. 26 is loaded and executed in the personal computer 30 shown in FIGS. 1, 2 and 3.

The subject detecting apparatus 900 shown in FIG. 27 includes the image acquiring section 510, the extracting section 520, the filtering section 530, the second probability distribution calculating section 940, the first integrating section 551, the second integrating section 552, the output section 560, an update control section 570, the second extracting section 980, and the second determining section 990. In addition, the second probability distribution calculating section 940 includes the second interpolation operating section 941.

Further, among the elements that are included in the subject detecting apparatus 900, the image acquiring section 510, the extracting section 520, the filtering section 530, the second probability distribution calculating section 940, the second interpolation operating section 941, the first integrating section 551, the second integrating section 552, the output section 560, and the update control section 570 are included the probability distribution constructing apparatus according to the second embodiment of the present invention. The second extracting section 980 and the second determining section 990 are not included.

Furthermore, the image acquiring section 510, the extracting section 520, the filtering section 530, the second probability distribution calculating section 940, the second interpolation operating section 941, the first integrating section 551, the second integrating section 552, the output section 560, the update control section 570, the second extracting section 980, and the second determining section 990 that are included in the subject detecting apparatus 900 are respectively configured by combining the image acquiring section 410, the extracting section 420, the filtering section 430, the second probability distribution calculating section 840, the second interpolation operating section 841, the first integrating section 451, the second integrating section 452, the output section 460, the update control section 470, the second extracting section 880, and the second determining section 890 that are program components of the subject detecting program 800 shown in FIG. 26 with hardware and an OS (Operation System) or an application program of the personal computer 30 shown in FIGS. 1, 2 and 3, which are required to realize the functions of the program components.

Next, the steps of the subject detecting method shown in FIG. 25, the program components of the subject detecting program 800 shown in FIG. 26, and the elements of the subject detecting apparatus 900 shown in FIG. 27 will be described.

The image acquiring step (step S11), the extracting step (step S12), the filtering step (step S13), the second probability distribution calculating step (step S24), the first integrating step (step S15), the second integrating step (step S16), the second extracting step (step S27), and the second determining step (step S28) of the subject detecting method shown in FIG. 25 respectively correspond to the image acquiring section 510, the extracting section 520, the filtering section 530, the second probability distribution calculating section 940, the second interpolation operating section 941, the first integrating section 551, the second integrating section 552, the second extracting step 980, and the second determining section 990, except for the output section 560 and the update control section 570 of the subject detecting apparatus 900 shown in FIG. 27. In addition, the program components of the subject detecting program 800 shown in FIG. 26 respectively correspond to the elements of the subject detecting apparatus 900 shown in FIG. 27.

Accordingly, the description of the elements of the subject detecting apparatus 900 shown in FIG. 27 will serve as the description of the steps of the subject detecting method shown in FIG. 25 and the description of the program components of the subject detecting program 800 shown in FIG. 26.

In addition, as described above, among the elements that are included in the subject detecting apparatus 900, except for the second extracting section 980 and the second determining section 990, the elements of the image acquiring section 510, the extracting section 520, the filtering section 530, the second probability distribution calculating section 940, the second interpolation operating section 941, the first integrating section 551, the second integrating section 552, the output section 560, and the update control section 570 are elements included in the probability distribution constructing apparatus according to the second embodiment of the present invention. Thus, the description of these elements will serve as the description of the probability distribution constructing apparatus according to the second embodiment of the present invention.

Here, the conceptual functions of the elements of the subject detecting apparatus 900 will be described and the specific functions and operations of the elements will be described later.

The second probability distribution calculating section 940 of the subject detecting apparatus 900 shown in FIG. 27 is an element that corresponds to the second probability distribution calculating step (step S24) of the subject detecting method shown in FIG. 25, and also corresponds to the second probability distribution calculating section 840 of the subject detecting program 800 shown in FIG. 26 in terms of application software. The second probability distribution calculating section 94 calculates an appearance probability distribution of the size of a head portion extracted by the filtering section 530. In addition, the second probability distribution calculating section 940 calculates an appearance size probability distribution of the head portion appearing at one location in a view angle for this location, and similarly calculates an appearance size probability distribution for each of plural locations in the view angle. The second probability distribution calculating section 940 shows an example of the function of the probability distribution calculating section according to the present invention, and the function of the second probability distribution calculating section 94 is mainly realized by the CPU 311 incorporated in the main device 31 of the personal computer 30 shown in FIGS. 1, 2 and 3 for executing the second probability distribution calculating section 840 (refer to FIG. 26) serving a program component.

The functions of the elements of the subject detecting apparatus 900, which will be described, are also mainly realized by the CPU 311 incorporated in the main device 31 of the personal computer 30 shown in FIGS. 1, 2 and 3. Accordingly, in order to avoid overlapping description, the hardware configuration of these elements will not be described.

The second interpolation operating section 941 included in the second probability distribution calculating section 940 of the subject detecting apparatus 900 shown in FIG. 27 is an element that corresponds to the second probability distribution calculating step (step S24) of the subject detecting method shown in FIG. 25, and also corresponds to the second interpolation operating section 841 of the subject detecting program 800 shown in FIG. 26 in terms of application software. The second interpolation operating section 941 calculates an appearance size probability distribution at a predetermined location in the view angle by applying an interpolation operating process to an appearance size probability distribution at a location different from the predetermined location. The second interpolation operating section 941 is an example of the function of the interpolation operating section according to the present invention.

Further, the second extracting section 980 of the subject detecting apparatus 900 shown in FIG. 27 is an element that corresponds to the second extracting step (step S27) of the subject detecting method shown in FIG. 25 and is an element that corresponds to the second extracting section 880 of the subject detecting program 800 shown in FIG. 26 in terms of application software. The second extracting section 980 extracts, from an image obtained by new photographing using the monitoring camera 10, a head portion shape similar to the shape of a head portion of a person together with the size of this similar head portion shape, positional information of the monitoring camera 10 on the view angle, and an evaluation value that indicates the probability of the similar head portion shape being the head portion of the person. The second extracting section 980 is an example of the function of the second extracting section according to the present invention.

Furthermore, the second determining section 990 of the subject detecting apparatus 900 shown in FIG. 27 is an element that corresponds to the second determining step (step S28) of the subject detecting method shown in FIG. 25 and is an element that corresponds to the second determining section 890 of the subject detecting program 800 shown in FIG. 26 in terms of application software. The second determining section 990 modifies the evaluation value on the basis of the size of the similar head portion shape extracted by the second extracting section 980, the positional information, and the evaluation value, and the appearance probability distribution calculated by the second probability distribution calculating section 940, and determines whether the similar head portion shape is the head portion of the person based on the modified evaluation value. The second determining section 990 is an example of the function of the second determining section according to the present invention.

Now, the subject detecting apparatus according to the second embodiment of the present invention will be specifically described.

Figure 28:
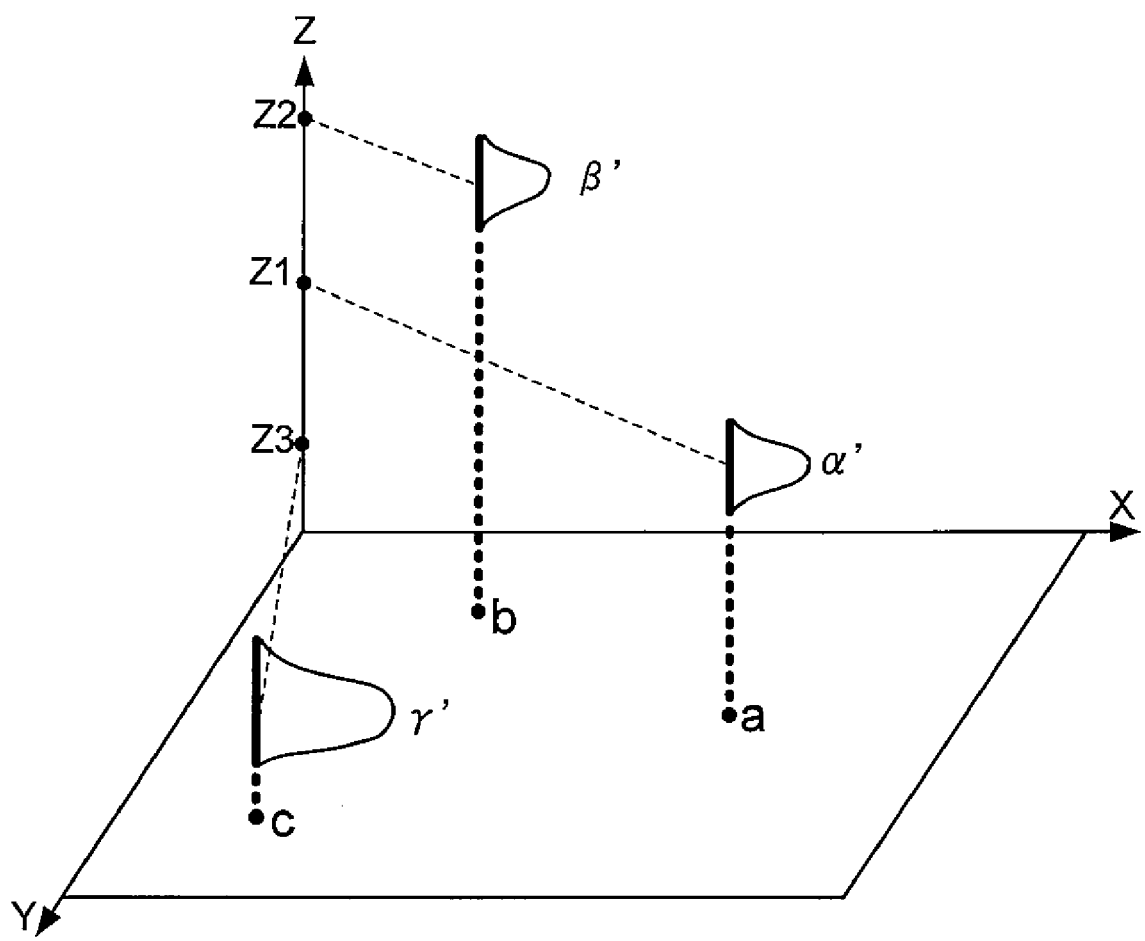
FIG. 28 is a diagram illustrating an example of an appearance probability distribution that is calculated by a second probability distribution calculating section and output by an output section.

FIG. 28 is a diagram illustrating an example of the appearance probability distribution calculated by the second probability distribution calculating section 940 and output by an output section 560.

The second probability distribution calculating section 940 calculates an appearance probability distribution of the size of the head portion extracted by the filtering section 530. Specifically, the second probability distribution calculating section 940 calculates an appearance size probability distribution of the head portion appearing at one location in a view angle, and similarly calculates an appearance size probability distribution for each of plural locations in the view angle. For example, FIG. 28 shows: an appearance size probability distribution $\alpha'$ of a size "Z1" of the head portion that is extracted by the filtering section 530 and appears at a location "a" in the view angle; and an appearance size probability distribution $\beta'$ of a size "Z2" of the head portion that is extracted by the filtering section 530 and appears at a location "b" in the view angle.

In addition, the second interpolation operating section 941 of the second probability distribution calculating section 940 calculates an appearance size probability distribution at a predetermined location in the view angle by applying an interpolation operating process to an appearance size probability distribution at a location different from the predetermined location. In FIG. 28, an appearance probability distribution $\gamma'$ of a size "Z3" of the head portion at a location "b" in the view angle is an appearance probability distribution calculated by the second interpolation operating section 941.

Further, the probability variables of the appearance probability distributions $\alpha$, $\beta$, and $\gamma$ shown in FIG. 28 that are calculated by the second probability distribution calculating section B940 and output by the output section 560 are Z axis values.

Even when the number of head portions at any locations in the view angle among the plural head portions extracted by the filtering section 530 is small, the second interpolation operating section 941 can calculate an appearance probability distribution over the entire range of the view angle of the monitoring camera 10.

The output section 560 outputs the appearance probability distribution calculated by the second probability distribution calculating section 940. The three appearance probability distributions $\alpha'$, $\beta'$ and $\gamma'$ shown in FIG. 28 are examples of the appearance probability distribution output by the output section 560.

Using the same method as the extraction method executed by the extracting section 520 that has been described with reference to FIGS. 8 to 16 in the first embodiment, the second extracting section 980 extracts a semicircle of 180° as a head portion shape similar to the head portion of the person from an image obtained by new photographing using the monitoring camera 10, together with the diameter size of the semicircle of 180° that is the size of the similar head portion shape and central coordinates of the semicircle of 180° that is positional information of the monitoring camera 10 on the view angle. Further, the second extracting section 980 extracts the semicircle of 180°, together with an evaluation value that indicates the probability of the similar head portion shape being the head portion of the person, that is, an integrated evaluation value associated with the extracted semicircle of 180°.

The second determining section 990 modifies the evaluation value on the basis of the size of the similar head portion shape, the positional information, the evaluation value extracted by the second extracting section 980, and the appearance probability distribution calculated by the second probability distribution calculating section 940, and determines whether the similar head portion shape is the head portion of the person based on the modified evaluation value.

According to the first embodiment that has the appearance area defining step (step S17), the appearance area defining section 480, the appearance area defining section 580, the subject detecting step (step S18), the subject detecting section 490, and the subject detecting section 590, when the appearance probability is low on the appearance probability distribution, it is determined that the similar head portion shape is not the head portion of the person. Meanwhile, according to the second embodiment that has the second extracting step (step S27), the second extracting section 880, the second extracting section 980, the second determining step (step S28), the second determining section 890, and the second determining section 990, when the evaluation value is high even though the appearance probability is low on the appearance probability distribution, it is determined that the similar head portion shape is the head portion of the person. As a result, the head portion can be detected with high precision.

As each of the embodiments, the detecting method that detects the head portion of the person by detecting the approximately semicircular shape has been described. However, the detecting method that detects the head portion of the person is not limited thereto. For example, other detecting methods such as a method that detects not only the external shape of the head portion of the person but also the internal characteristic may be used. Further, in the above-described embodiments, the head portion of the person has been used as an example of the "subject of a specific type" according to the present invention. However, the "subject of a specific type" of the present invention is not limited to the head portion of the person, and may be various subjects such as a face of the person or a wild bird observed outdoors.

What is claimed is:

1. A probability distribution constructing method that constructs, based on plural images obtained by repeatedly photographing a field where a plurality of persons exist using a fixedly disposed camera, appearance probability distributions of head portions of the plurality of persons repeatedly appearing in various sizes in the plural images, the probability distribution constructing method comprising:
   an image acquiring step that acquires the plural images from the camera;
   an extracting step that extracts, from the plural images acquired in the image acquiring step, similar head portion shapes each of which is similar to a predetermined typical shape of a head portion of a person, together with sizes of the similar head portion shapes and positional information of the camera on a view angle;
   a filtering step that determines whether the similar head portion shapes extracted in the extracting step are head portions of persons or not, and that extracts head portions determined in the determination; and
   a probability distribution calculating step that calculates, (a) for each of plural sizes of the extracted head portions, an appearance location probability distribution whose probability variable is each location in the view angle and which represents appearance probabilities of head portions classified as having the same size as the each of the plural sizes, of the extracted head portions or (b) for each location in the view angle, an appearance size probability distribution whose probability variable is each of plural sizes of the extracted head portions and which represents appearance probabilities of head portions appeared in the each location in the view angle,
   wherein the filtering step is a step of (1) counting, for each of the extracted similar head portion shapes in the extracting step, the number of other similar head portion shapes except for the each of the extracted similar head portion shapes which exist in a search area having a predetermined size and being spread around the each of the extracted similar head portion shapes in the view angle and which are classified as having the same size as size of the each of the extracted similar head portion shapes, and (2) determining the each of the extracted similar head portion shapes (2a) as being one of the head portions when the number of the other similar head portion shapes obtained by the counting is equal to or larger than a predetermined threshold value being one or more and (2b) as not being one of the head portions when the number of the other similar head portion shapes obtained by the counting is less than the threshold value.

2. The probability distribution constructing method according to claim 1, wherein the probability distribution calculating step includes:
   a step of calculating an appearance location probability distribution of the head portions in a predetermined size by applying an interpolation operating process to an appearance location probability distribution of the head portions in a size different from the predetermined size.

3. The probability distribution constructing method according to claim 1, wherein the probability distribution calculating step includes:
   a step of calculating an appearance size probability distribution at a predetermined location in the view angle by applying an interpolation operating process to an appearance size probability distribution at a location different from the predetermined location.

4. The probability distribution constructing method according to claim 1, wherein the extracting step is a step of calculating, when extracting the similar head portion shape, an evaluation value that indicates a degree of the possibility that the similar head portion shape belongs to the head portion targeted for extraction, and extracting the similar head portion shape only when the evaluation value is higher, in term of the possibility that the similar head portion shape belongs to the head portion targeted for the extraction, than a threshold value set to allow leakage from the extraction.

5. The probability distribution constructing method according to claim 1,
   wherein the camera is a camera that can change a photographing direction, and
   the probability distribution constructing method further comprises an integrating step of integrating the appearance probability distributions obtained by photographing in plural photographing directions, thereby constructing an appearance probability distribution in a view angle that is obtained by linking view angles of the plural photographing directions.

6. The probability distribution constructing method according to claim 1,
   wherein the camera is a camera that can change a focal distance, and
   the probability distribution constructing method further comprises an integrating step of integrating the appearance probability distributions obtained by photographing based on plural focal distances, thereby constructing an appearance probability distribution in a view angle of a widest angle of the camera.

7. A head portion detecting method, comprising:
the probability distribution constructing method according to claim 1;
an appearance area defining step of defining an appearance area for each size of the head portion appearing in the view angle of the camera, on the basis of the appearance probability distribution calculated in the probability distribution calculating step; and
a head portion detecting step of detecting the head portion appearing as a similar head portion shape having the size, in an appearance area according to the size in an image obtained by new photographing using the camera.

8. A head portion detecting method, comprising:
the probability distribution constructing method according to claim 1;
a second extracting step of extracting a similar head portion shape similar to the head portion from an image obtained by new photographing using the camera, together with a size of the similar head portion shape, positional information of the camera on the view angle, and an evaluation value that indicates the probability of the similar shape being the head portion; and
a second determining step of modifying the evaluation value on the basis of the size of the similar head portion shape, the positional information, and the evaluation value extracted in the second extracting step, as well as the appearance probability distribution calculated in the probability distribution calculating step, and determining whether the similar head portion shape is the head portion on the basis of the modified evaluation value.

9. A probability distribution constructing apparatus that constructs, based on plural images obtained by repeatedly photographing a field where a plurality of persons exist using a fixedly disposed camera, appearance probability distribution distributions of head portions of the plurality of persons repeatedly appearing in various sizes in the plural images, the probability distribution constructing apparatus comprising:
an image acquiring section that acquires the plural images from the camera;
an extracting section that extracts, from the plural images acquired by the image acquiring section, similar head portion shapes each of which is similar a predetermined typical shape of head portion of a person, together with sizes of the similar head portion shapes and positional information of the camera on a view angle;
a filtering section that determines whether the similar head portion shapes extracted by the extracting section are head portions of persons or not, and that extracts head portions determined in the determination; and
a probability distribution calculating section that calculates, (a) for each of plural sizes of the extracted head portions, an appearance location probability distribution whose probability variable is each location in the view angle and which represents appearance probabilities of head portions classified as having the same size as the each of the plural sizes, of the extracted head portions or (b) for each location in the view angle, an appearance size probability distribution whose probability variable is each of plural sizes of the extracted head portions and which represents appearance probabilities of head portions appeared in the each location in the view angle,
wherein the filtering step is a step of (1) counting, for each of the extracted similar head portion shapes in the extracting step, the number of other similar head portion shapes except for the each of the extracted similar head portion shapes which exist in a search area having a predetermined size and being spread around the each of the extracted similar head portion shapes in the view angle and which are classified as having the same size as size of the each of the extracted similar head portion shapes, and (2) determining the each of the extracted similar head portion shapes (2a) as being one of the head portions when the number of the other similar head portion shapes obtained by the counting is equal to or larger than a predetermined threshold value being one or more and (2b) as not being one of the head portions when the number of the other similar head portion shapes obtained by the counting is less than the threshold value.

10. The probability distribution constructing apparatus according to claim 9, wherein the probability distribution calculating section includes:
an interpolation operating process that calculates an appearance location probability distribution of the head portion in a predetermined size by applying an interpolation operating process to an appearance location probability distribution of the head portion in a size different from the predetermined size.

11. The probability distribution constructing apparatus according to claim 9, wherein the probability distribution calculating section includes:
an interpolation operating section that calculates an appearance size probability distribution at a predetermined location in the view angle by applying an interpolation operating process to an appearance size probability distribution at a location different from the predetermined location.

12. The probability distribution constructing apparatus according to claim 9, wherein the extracting section calculates, when extracting the similar head portion shape, an evaluation value that indicates a degree of the possibility that the similar head portion shape belongs to the head portion targeted for extraction, and extracting the similar head portion shape only when the evaluation value is higher, in term of the possibility that the similar head portion shape belongs to the head portion targeted for the extraction, than a threshold value set to allow leakage from the extraction.

13. The probability distribution constructing apparatus according to claim 9,
wherein the camera is a camera that can change a photographing direction, and
the probability distribution constructing apparatus further comprises an integrating section that integrates the appearance probability distributions obtained by photographing in plural photographing directions, thereby constructing an appearance probability distribution in a view angle that is obtained by linking view angles of the plural photographing directions.

14. The probability distribution constructing apparatus according to claim 9,
wherein the camera is a camera that can change a focal distance, and
the probability distribution constructing apparatus further comprises an integrating section that integrates the appearance probability distributions obtained by photographing based on plural focal distances, thereby constructing an appearance probability distribution in a view angle of a widest angle of the camera.

15. The probability distribution constructing apparatus according to claim 9, further comprising:
an output section that outputs the appearance probability distribution calculated by the probability distribution calculating section.

16. The probability distribution constructing apparatus according to claim 9, further comprising:
an update control section that causes, even after the appearance probability distribution is constructed, the image acquiring section to newly acquire an image, causes the extracting section and the filtering section to apply respective processes to the newly acquired image, and causes the probability distribution calculating section to upon date the appearance probability distribution by adding thereto information about the head portion of the specific type extracted from the newly acquired image.

17. A head portion detecting apparatus comprising:
the probability distribution constructing apparatus according to claim 9;
an appearance area defining section that defines an appearance area for each size of the head portion appearing in the view angle of the camera, on the basis of the appearance probability distribution calculated by the probability distribution calculating section; and
a head portion detecting section that detects the head portion as a similar head portion shape having the size, in an appearance area according to the size in an image obtained by new photographing using the camera.

18. A head portion detecting apparatus comprising:
the probability distribution constructing apparatus according to claim 9;
a second extracting section that extracts a similar head portion shape similar to the head portion from an image obtained by new photographing using the camera, together with a size of the similar head portion shape, positional information of the camera on the view angle, and an evaluation value that indicates the probability of the similar head portion shape being the subject of the specific type; and
a second determining section that modifies the evaluation value on the basis of the size of the similar head portion shape, the positional information, and the evaluation value extracted in the second extracting step, as well as the appearance probability distribution calculated by the probability distribution calculating section, and determines whether the similar head portion shape is the head portion on the basis of the modified evaluation value.

19. A non-transitory computer-readable medium that stores a probability distribution constructing program that is executed in a computer and allows the computer to operate as a probability distribution constructing apparatus that constructs, based on plural images obtained by repeatedly photographing a field where a plurality of persons exist using a fixedly disposed camera, appearance probability distributions of head portions of the plurality of persons repeatedly appearing in various sizes in the plural images, the probability distribution constructing program causes the computer to implement:
an image acquiring section that acquires the plural images from the camera;
an extracting section that extracts, from the plural images acquired by the image acquiring section, similar head portion shapes each of which is similar to a predetermined typical shape of a head portion of a person, together with sizes of the similar head portion shapes and positional information of the camera on a view angle;
a filtering section that determines whether the similar head portion shapes extracted by the extracting section are head portions of persons or not, and that extracts head portions determined in the determination; and
a probability distribution calculating section that calculates, (a) for each of plural sizes of the extracted head portions, an appearance location probability distribution whose probability variable is each location in the view angle and which represents appearance probabilities of head portions classified as having the same size as the each of the plural sizes, of the extracted head portions or (b) for each location in the view angle, an appearance size probability distribution whose probability variable is each of plural sizes of the extracted head portions and which represents appearance probabilities of head portions appeared in the each location in the view angle,
wherein the filtering step is a step of (1) counting, for each of the extracted similar head portion shapes in the extracting step, the number of other similar head portion shapes except for the each of the extracted similar head portion shapes which exist in a search area having a predetermined size and being spread around the each of the extracted similar head portion shapes in the view angle and which are classified as having the same size as size of the each of the extracted similar head portion shapes, and (2) determining the each of the extracted similar head portion shapes (2a) as being one of the head portions when the number of the other similar head portion shapes obtained by the counting is equal to or larger than a predetermined threshold value being one or more and (2b) as not being one of the head portions when the number of the other similar head portion shapes obtained by the counting is less than the threshold value.

20. A non-transitory computer-readable medium that stores a head portion detecting program having the probability distribution constructing program according to claim 19, the subject detecting program causing the computer operating as the head portion detecting apparatus to further implement:
an appearance area defining section that defines an appearance area for each size of the head portion appearing in the view angle of the camera, on the basis of the appearance probability distribution calculated by the probability distribution calculating section; and
a head portion detecting section that detects the head portion of the specific type appearing as a similar head portion shape having the size, in an appearance area according to the size in an image obtained by new photographing using the camera.

21. A non-transitory computer-readable medium that stores a head portion detecting program having the probability distribution constructing program according to claim 19, the head portion detecting program causing the computer operating as the head portion detecting apparatus to further implement:
a second extracting section that extracts a similar head portion shape similar to the head portion from an image obtained by new photographing using the camera, together with a size of the similar head portion shape, positional information of the camera on the view angle, and an evaluation value that indicates the probability of the similar head portion shape being the head portion; and
a second determining section that modifies the evaluation value on the basis of the size of the similar head portion shape, the positional information, and the evaluation value extracted in the second extracting step, as well as the appearance probability distribution calculated by the probability distribution calculating section, and determines whether the similar head portion shape is the head portion on the basis of the modified evaluation value.

* * * * *